United States Patent
Takano et al.

(10) Patent No.: US 10,241,308 B2
(45) Date of Patent: Mar. 26, 2019

(54) PROJECTION OPTICAL SYSTEM INCLUDING MOVABLE LENS GROUPS AND IMAGE DISPLAY APPARATUS

(71) Applicant: Ricoh Company, Ltd., Tokyo (JP)

(72) Inventors: Yohei Takano, Kanagawa (JP); Hibiki Tatsuno, Kanagawa (JP); Nobuyuki Arai, Kanagawa (JP); Hirotoshi Nakayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/707,565

(22) Filed: Sep. 18, 2017

(65) Prior Publication Data

US 2018/0003934 A1 Jan. 4, 2018

Related U.S. Application Data

(63) Continuation of application No. 14/971,671, filed on Dec. 16, 2015, now Pat. No. 9,766,438, which is a continuation of application No. 14/272,838, filed on May 8, 2014, now Pat. No. 9,261,767.

(30) Foreign Application Priority Data

May 20, 2013 (JP) .................................. 2013-105851

(51) Int. Cl.
| | | |
|---|---|---|
| *G03B 21/28* | (2006.01) | |
| *G02B 17/08* | (2006.01) | |
| *G02B 13/16* | (2006.01) | |
| *G02B 3/04* | (2006.01) | |

(Continued)

(52) U.S. Cl.
CPC ............... *G02B 17/08* (2013.01); *G02B 3/04* (2013.01); *G02B 5/10* (2013.01); *G02B 13/16* (2013.01); *G02B 17/0852* (2013.01); *G02B 17/0896* (2013.01); *G03B 21/28* (2013.01); *G03B 21/14* (2013.01)

(58) Field of Classification Search
CPC .... G02B 13/16; G02B 17/08; G02B 17/0852; G02B 17/0896; G03B 21/28; G03B 21/14; G03B 21/147
See application file for complete search history.

(56) References Cited

U.S. PATENT DOCUMENTS

| | | | |
|---|---|---|---|
| 7,048,388 B2 | 5/2006 | Takaura | |
| 7,441,908 B2 | 10/2008 | Takaura | |
| 7,631,975 B2 | 12/2009 | Takaura | |

(Continued)

FOREIGN PATENT DOCUMENTS

| | | |
|---|---|---|
| CN | 101221282 A | 7/2008 |
| CN | 102893197 A | 1/2013 |

(Continued)

OTHER PUBLICATIONS

Japanese Office Action issued in Application No. 2013-557344 dated Apr. 21, 2015 (partial English translation).

(Continued)

*Primary Examiner* — Bao-Luan Q Le
(74) *Attorney, Agent, or Firm* — Oblon, McClelland, Maier & Neustadt, L.L.P.

(57) ABSTRACT

There is provided a projection optical system capable of projecting an image formed on an image forming unit on a projection plane, which has an extremely short projection distance and a small size.

13 Claims, 49 Drawing Sheets

(51) Int. Cl.
*G02B 5/10* (2006.01)
*G03B 21/14* (2006.01)

(56) References Cited

U.S. PATENT DOCUMENTS

| | | | |
|---|---|---|---|
| 7,637,618 B2 | 12/2009 | Takaura | |
| 7,637,621 B2 | 12/2009 | Takaura | |
| 7,766,487 B2* | 8/2010 | Hisada | G03B 21/28 353/101 |
| 7,766,488 B2* | 8/2010 | Hirata | H04N 9/317 353/101 |
| 7,850,313 B2* | 12/2010 | Hirata | H04N 9/317 353/101 |
| 7,914,153 B2* | 3/2011 | Hirata | H04N 9/317 353/101 |
| 7,922,341 B2 | 4/2011 | Takaura | |
| 7,938,545 B2 | 5/2011 | Takaura | |
| 7,946,717 B2 | 5/2011 | Abe | |
| 8,002,417 B2* | 8/2011 | Hisada | G03B 21/28 353/101 |
| 8,002,418 B2* | 8/2011 | Hirata | H04N 9/317 353/101 |
| 8,020,999 B2* | 9/2011 | Hirata | H04N 9/317 353/101 |
| 8,025,415 B2 | 9/2011 | Abe | |
| 8,113,667 B2 | 2/2012 | Yamada | |
| 8,182,097 B2* | 5/2012 | Hirata | H04N 9/317 353/101 |
| 8,210,693 B2 | 7/2012 | Nishikawa | |
| 8,292,438 B2* | 10/2012 | Nishikawa | H04N 9/3105 353/101 |
| 8,408,717 B2* | 4/2013 | Hirata | H04N 9/317 353/101 |
| 8,425,044 B2 | 4/2013 | Yamada | |
| 8,511,837 B2 | 8/2013 | Takahashi | |
| 8,616,711 B2* | 12/2013 | Yatsu | G02B 13/16 353/101 |
| 8,657,450 B2 | 2/2014 | Abe | |
| RE45,258 E | 11/2014 | Takaura | |
| 8,905,550 B2 | 12/2014 | Takahashi | |
| 8,922,883 B2 | 12/2014 | Tatsuno | |
| 8,950,874 B2 | 2/2015 | Tatsuno | |
| 8,985,786 B2 | 3/2015 | Tujioka | |
| 9,039,196 B2 | 5/2015 | Hirakawa | |
| 9,069,238 B2 | 6/2015 | Nishina | |
| 9,091,908 B2 | 7/2015 | Yamada | |
| 2004/0156117 A1 | 8/2004 | Takaura | |
| 2006/0009188 A1 | 1/2006 | Kubota | |
| 2006/0126032 A1 | 6/2006 | Takaura | |
| 2007/0279598 A1* | 12/2007 | Hisada | G03B 21/147 353/70 |
| 2007/0291236 A1* | 12/2007 | Hirata | H04N 9/317 353/77 |
| 2008/0068563 A1 | 3/2008 | Abe | |
| 2008/0068564 A1 | 3/2008 | Abe | |
| 2008/0162027 A1 | 7/2008 | Murphy | |
| 2008/0304019 A1 | 12/2008 | Takaura | |
| 2009/0015801 A1 | 1/2009 | Takaura | |
| 2009/0015910 A1 | 1/2009 | Takaura | |
| 2009/0021703 A1 | 1/2009 | Takaura | |
| 2010/0004839 A1 | 1/2010 | Yokoyama | |
| 2010/0039625 A1 | 2/2010 | Takaura | |
| 2010/0097581 A1 | 4/2010 | Yamada | |
| 2010/0118281 A1 | 5/2010 | Yamada | |
| 2010/0128234 A1* | 5/2010 | Nishikawa | H04N 9/3105 353/98 |
| 2010/0245784 A1 | 9/2010 | Nishikawa | |
| 2010/0265470 A1* | 10/2010 | Hirata | H04N 9/317 353/70 |
| 2010/0265471 A1* | 10/2010 | Hirata | H04N 9/317 353/70 |
| 2010/0265474 A1* | 10/2010 | Hirata | H04N 9/317 353/98 |
| 2010/0283976 A1* | 11/2010 | Hisada | G03B 21/147 353/70 |
| 2011/0038039 A1 | 2/2011 | Takaura | |
| 2011/0075113 A1* | 3/2011 | Hirata | H04N 9/317 353/70 |
| 2011/0112766 A1 | 5/2011 | Haran | |
| 2011/0115646 A1 | 5/2011 | Matsumura | |
| 2011/0267687 A1 | 11/2011 | Kim et al. | |
| 2011/0299047 A1* | 12/2011 | Hirata | H04N 9/317 353/70 |
| 2011/0299049 A1* | 12/2011 | Yatsu | G02B 13/18 353/98 |
| 2012/0019791 A1 | 1/2012 | Abe | |
| 2012/0092628 A1 | 4/2012 | Takahashi | |
| 2012/0229777 A1* | 9/2012 | Hirata | H04N 9/317 353/38 |
| 2012/0300318 A1 | 11/2012 | Lin et al. | |
| 2013/0070217 A1 | 3/2013 | Tatsuno | |
| 2013/0114053 A1 | 5/2013 | Tatsuno et al. | |
| 2013/0235356 A1 | 9/2013 | Takahashi | |
| 2014/0268073 A1 | 9/2014 | Takano | |
| 2015/0138625 A1 | 5/2015 | Tatsuno | |

FOREIGN PATENT DOCUMENTS

| | | |
|---|---|---|
| CN | 102998783 A | 3/2013 |
| JP | 63-293660 A | 11/1988 |
| JP | 1-228100 A | 9/1989 |
| JP | 2005-244745 A | 9/2005 |
| JP | 2006-48624 | 2/2006 |
| JP | 2008-293143 A | 12/2008 |
| JP | 2008-299666 | 12/2008 |
| JP | 2009-9610 | 1/2009 |
| JP | 2009-217729 A | 9/2009 |
| JP | 2009-265837 | 11/2009 |
| JP | 2010-9235 | 1/2010 |
| JP | 2010-146174 A | 7/2010 |
| JP | 2011-242606 A | 12/2011 |
| JP | 4865922 | 2/2012 |
| JP | 2013-64816 A | 4/2013 |
| WO | 2010/103636 A1 | 9/2010 |

OTHER PUBLICATIONS

International Search Report issued in PCT/JP12/053192 dated Apr. 24, 2012.

Combined Office Action and Search Report dated Mar. 24, 2016 in Chinese Patent Application No. 201410215867.9 with English translation of category of cited document.

Office Action dated Apr. 26, 2017 in Japanese Patent Application No. 2013-105851.

* cited by examiner

UPPER

LEFT

LOWER

FIG. 49

| EQUATION 1 | $X = \dfrac{C \cdot H^2}{1 + \sqrt{(1-(1+K) \cdot C^2 \cdot H^2)}} + \sum_{i=1} A_i \cdot H^i$ |
|---|---|
| EQUATION 2 | $X = \dfrac{C \cdot H^2}{1 + \sqrt{(1-(1+K) \cdot C^2 \cdot H^2)}} + \sum_{j=1} C_j \cdot x^m y^n$ |
| EQUATION 3 | $j = \dfrac{(m+n)^2 + m + 3n}{2} + 1$ |

FIG. 50

TABLE 1

APERTURE : 0.195

| S | R | D | Nd | Vd | OPTICAL LENGTH |
|---|---|---|---|---|---|
| 1 | ∞ | 1.00 | | | – |
| 2 | ∞ | 1.00 | 1.51680 | 64.2000 | – |
| 3 | ∞ | 28.00 | | | – |
| 4* | 14.226 | 3.62 | 1.48749 | 70.4412 | 0.14 |
| 5* | −2774.4 | 4.56 | | | 0.65 |
| 6 | 26.177 | 1.00 | 1.85946 | 25.2166 | 2.22 |
| 7 | 14.718 | 10.00 | | | 2.37 |
| 8 | 28.724 | 6.52 | 1.56583 | 44.8043 | 6.94 |
| 9 | −10.007 | 0.80 | 1.90366 | 31.3150 | 7.32 |
| 10 | −15.375 | 0.00 | | | 7.85 |
| STOP | ∞ | 0.3 | | | 7.95 |
| 11 | 94.678 | 3.35 | 1.54931 | 68.9942 | 7.98 |
| 12 | −18.050 | 0.10 | | | 7.97 |
| 13 | −26.196 | 0.80 | 1.81850 | 45.9127 | 7.73 |
| 14 | 24.468 | 3.54 | | | 7.68 |
| 15 | −29.919 | 5.96 | 1.58760 | 39.3633 | 8.00 |
| 16 | −9.250 | 0.90 | 1.87767 | 34.4314 | 8.43 |
| 17 | −21.305 | 0.30 | | | 10.17 |
| 18 | 60.278 | 3.73 | 1.66886 | 31.2390 | 11.78 |
| 19 | −56.945 | VARIABLE A | | | 11.95 |
| 20 | 32.648 | 4.31 | 1.63301 | 34.1231 | 13.60 |
| 21 | 408.689 | VARIABLE B | | | 13.40 |
| 22 | −22.721 | 1.00 | 1.85549 | 37.8228 | 13.16 |
| 23 | 1196.389 | 4.84 | | | 14.34 |
| 24* | −39.657 | 1.50 | 1.53046 | 55.8000 | 15.55 |
| 25* | 72.654 | VARIABLE C | | | 16.58 |
| 26* | 445.777 | 1.50 | 1.53046 | 55.8000 | 18.46 |
| 27* | 48.654 | 3.29 | | | 19.34 |
| 28* | 83.622 | 6.74 | 1.53046 | 55.8000 | 20.68 |
| 29* | −56.704 | VARIABLE D | | | 21.56 |
| 30 | ∞ | −75.71 | REFLECTOR | | – |
| 31* | ∞ | VARIABLE E | REFLECTOR | | – |

FIG. 51

TABLE 2

FOCUSING

| | NEAR DISTANCE | REF. | FAR DISTANCE |
|---|---|---|---|
| SCREEN SIZE | 48 INCH | 60 INCH | 80 INCH |
| VARIABLE A | 15.84 | 15.93 | 15.92 |
| VARIABLE B | 5.85 | 5.78 | 5.73 |
| VARIABLE C | 7.09 | 5.08 | 2.98 |
| VARIABLE D | 40.80 | 42.79 | 44.96 |
| VARIABLE E | 240.90 | 292.62 | 378.18 |

FIG. 52

TABLE 3

| S | K | A4 | A6 | A8 | A10 | A12 |
|---|---|---|---|---|---|---|
| 4 | 0.3639 | -4.4519E-05 | 1.9855E-07 | -3.7703E-09 | 3.9981E-11 | |
| 5 | 0.0000 | 5.6950E-05 | 3.1743E-07 | -1.5463E-09 | 3.8701E-11 | |
| 24 | 1.5212 | 2.6329E-05 | -1.6291E-08 | -2.0499E-11 | 6.8657E-14 | |
| 25 | -99.0000 | -3.1613E-05 | 4.4313E-08 | -8.1223E-11 | 4.4700E-14 | |
| 26 | 0.0000 | -3.9296E-05 | 4.8386E-08 | -4.6941E-11 | -6.7203E-15 | 1.3195E-16 |
| 27 | -3.6825 | -3.8986E-05 | -9.5303E-09 | 5.3261E-11 | -2.3749E-13 | 3.8846E-16 |
| 28 | -97.1149 | 1.3331E-05 | -6.9770E-08 | 9.3196E-11 | -1.1180E-13 | |
| 29 | 3.5698 | 1.1027E-06 | 3.4018E-08 | -6.2424E-11 | 2.4306E-15 | |

FIG. 53

TABLE 4

| K | 0 |
|---|---|
| C4 | 1.3191E-02 |
| C6 | 8.2059E-03 |
| C8 | -2.2710E-05 |
| C10 | -2.0021E-04 |
| C11 | -1.6375E-06 |
| C13 | 1.6340E-06 |
| C15 | -2.1474E-06 |
| C17 | -1.4534E-08 |
| C19 | 1.1343E-07 |
| C21 | 1.9723E-08 |
| C22 | 6.9101E-10 |
| C24 | -8.3849E-11 |
| C26 | 1.3662E-09 |
| C28 | 5.2346E-10 |
| C30 | 8.3775E-12 |
| C32 | -2.1792E-11 |
| C34 | -1.4839E-11 |
| C36 | -5.4074E-13 |
| C37 | -1.6153E-13 |
| C39 | -3.2989E-14 |
| C41 | -2.2412E-13 |
| C43 | -2.1606E-13 |
| C45 | -4.0609E-14 |
| C47 | -1.6383E-15 |
| C49 | 1.5061E-15 |
| C51 | 3.9260E-15 |
| C53 | 2.0349E-15 |
| C55 | 1.0514E-16 |
| C56 | 1.6193E-17 |
| C58 | 8.6710E-18 |
| C60 | 3.7556E-17 |
| C62 | 6.2031E-17 |
| C64 | 3.3629E-17 |
| C66 | 4.0820E-18 |

FIG. 54

TABLE 5

| DOT SIZE | 10.8um |
|---|---|
| HORIZONTAL LENGTH | 13.824mm |
| VERTICAL LENGTH | 8.64mm |
| OPTICAL AXIS — ELEMENT CENTER | 5.64mm |

FIG. 55

TABLE 6

| S | Y AXIS | Z AXIS | α |
|---|---|---|---|
| 30 | 0.00 | 44.96 | −45.00 |
| 31 | 75.71 | 54.23 | −100.23 |

FIG. 56A

TABLE 7A

APERTURE : 0.195

| S | R | D | Nd | Vd | GLASS NAME | MAKER | OPTICAL LENGTH |
|---|---|---|---|---|---|---|---|
| 1 | ∞ | 1.00 | | | | | - |
| 2 | ∞ | 1.00 | 1.51680 | 64.2000 | | | - |
| 3 | ∞ | 28.00 | | | | | - |
| 4* | 14.232 | 5.85 | 1.48749 | 70.4412 | FC5 | HOYA | 0.67 |
| 5* | -82.606 | 1.03 | | | | | 0.63 |
| 6 | 28.360 | 1.00 | 1.84666 | 23.7779 | S-TIH53 | OHARA | 0.98 |
| 7 | 17.723 | 9.48 | | | | | 1.14 |
| 8 | 54.064 | 4.83 | 1.54814 | 45.7843 | S-TIL1 | OHARA | 4.69 |
| 9 | -9.762 | 0.80 | 1.90366 | 31.3150 | TAFD25 | HOYA | 5.29 |
| 10 | -15.549 | 0.10 | | | | | 5.64 |
| STOP | ∞ | 0.3 | | | | | 5.83 |
| 11 | 102.973 | 2.68 | 1.48749 | 70.4412 | FC5 | HOYA | 5.91 |
| 12 | -16.673 | 0.10 | | | | | 6.04 |
| 13 | -29.387 | 3.99 | 1.83481 | 42.7218 | TAFD5F | HOYA | 6.01 |
| 14 | 23.734 | 3.83 | | | | | 6.39 |
| 15 | -34.163 | 5.47 | 1.53172 | 48.8407 | S-TIL6 | OHARA | 7.28 |

FIG. 56B

TABLE 7B

| | | | | | |
|---|---|---|---|---|---|
| 16 | -9.107 | 0.90 | 1.80400 | 46.5834 S-LAH65V OHARA | 7.87 |
| 17 | -21.305 | 3.69 | | | 9.44 |
| 18 | 72.991 | 5.05 | 1.63980 | 34.4664 S-TIM27 OHARA | 12.82 |
| 19 | -32.929 | VARIABLE A | | | 13.05 |
| 20 | 41.387 | 2.83 | 1.69895 | 30.1279 S-TIM35 OHARA | 13.60 |
| 21 | 111.113 | VARIABLE B | | | 13.44 |
| 22 | -20.391 | 1.00 | 1.90366 | 31.3150 TAFD25 HOYA | 12.90 |
| 23 | -154.612 | 3.04 | | | 14.43 |
| 24* | -47.793 | 2.76 | 1.53046 | 55.8000 RESIN | 15.53 |
| 25* | 64.889 | VARIABLE C | | | 16.83 |
| 26* | -75.133 | 2.19 | 1.53046 | 55.8000 RESIN | 18.90 |
| 27* | 118.861 | 2.18 | | | 20.04 |
| 28* | 95.608 | 5.47 | 1.53046 | 55.8000 RESIN | 21.18 |
| 29* | -48.685 | VARIABLE D | | | 21.91 |
| 30 | ∞ | -73.57 | REFLECTOR | | - |
| 31* | ∞ | VARIABLE E | REFLECTOR | | - |

FIG. 57

TABLE 8

FOCUSING

|  | NEAR DISTANCE | REF. | FAR DISTANCE |
|---|---|---|---|
| SCREEN SIZE | 48 INCH | 60 INCH | 80 INCH |
| VARIABLE A | 8.19 | 8.53 | 8.47 |
| VARIABLE B | 10.24 | 10.04 | 10.01 |
| VARIABLE C | 9.34 | 7.37 | 4.86 |
| VARIABLE D | 38.42 | 40.26 | 42.86 |
| VARIABLE E | 240.88 | 292.74 | 378.87 |

FIG. 58

TABLE 9

| S | K | A4 | A6 | A8 | A10 | A12 |
|---|---|---|---|---|---|---|
| 4 | −0.6086 | −2.0495E−07 | 2.6808E−07 | −8.9454E−10 | 2.4766E−11 | |
| 5 | 0.0000 | 7.7240E−05 | 9.9601E−08 | 2.4227E−09 | 1.1000E−11 | |
| 24 | 2.5635 | 2.1612E−05 | −8.0809E−09 | −2.3562E−12 | 2.4255E−14 | |
| 25 | −89.5733 | −3.7358E−05 | 5.4039E−08 | −8.4950E−11 | 6.3554E−14 | |
| 26 | 0.0000 | −3.0637E−05 | 5.4069E−08 | −7.1309E−11 | −1.9333E−14 | 1.6204E−16 |
| 27 | 21.8336 | −4.2214E−05 | −1.1300E−08 | 7.8769E−11 | −2.3214E−13 | 2.9588E−16 |
| 28 | −99.0000 | −7.5596E−06 | −3.4189E−08 | 6.3468E−11 | −9.6075E−14 | |
| 29 | 2.4863 | −2.6426E−06 | 3.1525E−08 | −4.7602E−11 | −1.0050E−14 | |

FIG. 59

TABLE 10

| K | 0 |
|---|---|
| C4 | 1.2660E-02 |
| C6 | 9.5211E-03 |
| C8 | 1.7134E-05 |
| C10 | -1.2972E-04 |
| C11 | -1.3398E-06 |
| C13 | 1.8186E-06 |
| C15 | -2.0112E-06 |
| C17 | -2.9636E-08 |
| C19 | 1.0972E-07 |
| C21 | 1.3390E-08 |
| C22 | 5.2749E-10 |
| C24 | -8.1285E-10 |
| C26 | 1.5367E-09 |
| C28 | 5.5051E-10 |
| C30 | 1.0513E-11 |
| C32 | -3.3882E-11 |
| C34 | -1.4158E-11 |
| C36 | 5.0848E-15 |
| C37 | -1.1671E-13 |
| C39 | 1.8650E-13 |
| C41 | -2.4957E-13 |
| C43 | -2.7201E-13 |
| C45 | -5.2890E-14 |
| C47 | -1.1336E-15 |
| C49 | 6.6744E-15 |
| C51 | 7.4842E-15 |
| C53 | 2.6273E-15 |
| C55 | 2.0300E-16 |
| C56 | 1.2438E-17 |
| C58 | 9.8405E-18 |
| C60 | 8.4606E-17 |
| C62 | 1.0066E-16 |
| C64 | 4.5295E-17 |
| C66 | 6.0515E-18 |

FIG. 60

TABLE 11

| DOT SIZE | 10.8um |
|---|---|
| HORIZONTAL LENGTH | 13.824mm |
| VERTICAL LENGTH | 8.64mm |
| OPTICAL AXIS − ELEMENT CENTER | 5.63mm |

FIG. 61

TABLE 12

| S | Y AXIS | Z AXIS | $\alpha$ |
|---|---|---|---|
| 30 | 0.00 | 42.86 | −45.00 |
| 31 | 73.57 | 48.26 | −95.52 |

FIG. 62A

TABLE 13A

APERTURE: 0.195

| S | R | D | Nd | Vd | GLASS NAME | MAKER | OPTICAL LENGTH |
|---|---|---|---|---|---|---|---|
| 1 | ∞ | 1.00 | | | | | — |
| 2 | ∞ | 1.00 | 1.51680 | 64.1983 | | | — |
| 3 | ∞ | 28.00 | | | | | — |
| 4* | 19.765 | 3.36 | 1.48749 | 70.2363 | S-FSL5 | OHARA | 1.19 |
| 5* | -67.954 | 4.50 | | | | | 1.91 |
| 6 | 24.431 | 1.00 | 1.90366 | 31.3150 | TAFD25 | HOYA | 3.45 |
| 7 | 15.956 | 4.58 | | | | | 3.55 |
| 8 | 29.430 | 0.75 | 1.90366 | 31.3150 | TAFD25 | HOYA | 5.59 |
| 9 | 12.701 | 6.46 | 1.58144 | 40.7476 | S-TIL25 | OHARA | 5.76 |
| 10 | -20.585 | 0.30 | | | | | 6.77 |
| STOP | ∞ | 0.3 | | | | | 7.06 |
| 11* | 25.032 | 4.42 | 1.48749 | 70.4412 | FC5 | HOYA | 7.34 |
| 12* | -18.832 | 0.30 | | | | | 7.39 |
| 13 | -75.099 | 1.01 | 1.83481 | 42.7253 | S-LAH55V | OHARA | 7.13 |
| 14 | 15.401 | 3.65 | | | | | 6.97 |
| 15 | -35.558 | 3.52 | 1.48749 | 70.2363 | S-FSL5 | OHARA | 7.44 |

FIG. 62B
TABLE 13B

| | | | | | |
|---|---|---|---|---|---|
| 16 | −12.066 | 1.20 | 1.90366 | 31.3150 | TAFD25 HOYA | 7.89 |
| 17 | −24.959 | 9.14 | | | | 8.96 |
| 18 | 98.434 | 5.26 | 1.78470 | 26.2912 | S-TIH23 OHARA | 14.65 |
| 19 | −44.523 | VARIABLE A | | | | 14.92 |
| 20 | 41.644 | 3.57 | 1.69895 | 30.1279 | S-TIM35 OHARA | 15.32 |
| 21 | 138.666 | VARIABLE B | | | | 15.11 |
| 22 | −27.076 | 1.20 | 1.84666 | 23.7779 | S-TIH53 OHARA | 14.62 |
| 23 | −112.416 | 4.89 | | | | 15.51 |
| 24* | −24.847 | 3.73 | 1.53046 | 55.8000 | RESIN | 15.79 |
| 25* | 67.396 | VARIABLE C | | | | 18.60 |
| 26* | −21.980 | 4.36 | 1.53046 | 55.8000 | RESIN | 19.88 |
| 27* | −26.619 | 0.30 | | | | 21.20 |
| 28* | −53.067 | 4.00 | 1.53046 | 55.8000 | RESIN | 21.47 |
| 29* | −30.336 | VARIABLE D | | | | 22.23 |
| 30 | ∞ | −79.13 | REFLECTOR | | | − |
| 31* | ∞ | VARIABLE E | REFLECTOR | | | − |

FIG. 63

TABLE 14

FOCUSING

| SCREEN SIZE | NEAR DISTANCE | REF. | FAR DISTANCE |
|---|---|---|---|
|  | 48 INCH | 60 INCH | 80 INCH |
| VARIABLE A | 6.50 | 7.57 | 8.50 |
| VARIABLE B | 8.94 |  | 8.05 |
| VARIABLE C | 13.64 | 12.01 | 10.26 |
| VARIABLE D | 40.57 | 41.60 | 42.83 |
| VARIABLE E | 239.78 | 291.71 | 378.38 |

FIG. 64

TABLE 15

| S | K | A4 | A6 | A8 | A10 | A12 | A14 | A16 |
|---|---|---|---|---|---|---|---|---|
| 4 | 0.321 | -1.549E-05 | 2.348E-07 | -8.023E-10 | 2.681E-11 | | | |
| 5 | 0.0000 | 6.621E-05 | 2.759E-07 | -1.140E-11 | 2.885E-11 | | | |
| 11 | 0.039 | 1.376E-06 | -4.475E-08 | | | | | |
| 12 | 0.189 | 2.530E-06 | -6.381E-08 | | | | | |
| 24 | -0.727 | 1.733E-05 | -1.008E-07 | 3.294E-10 | -5.241E-13 | | | |
| 25 | -3.607 | -4.578E-05 | 7.716E-08 | -1.653E-10 | 2.335E-13 | -1.953E-16 | | |
| 26 | -0.801 | 2.660E-05 | -3.323E-07 | 1.159E-09 | -1.614E-12 | 8.043E-16 | | |
| 27 | -0.439 | 1.047E-05 | 7.131E-08 | -1.254E-09 | -3.952E-12 | -4.868E-15 | 2.111E-18 | |
| 28 | 2.299 | -7.581E-05 | 5.903E-07 | -3.350E-09 | 9.671E-12 | -1.452E-14 | 1.119E-17 | -3.585E-21 |
| 29 | -1.174 | -5.710E-05 | 2.478E-07 | -1.176E-09 | 3.283E-12 | -4.590E-15 | 3.119E-18 | -8.254E-22 |

FIG. 65

TABLE 16

| K | 0 |
|---|---|
| C4 | 1.2663E-02 |
| C6 | 9.0693E-03 |
| C8 | -1.4730E-05 |
| C10 | -1.5861E-04 |
| C11 | -1.6146E-06 |
| C13 | 1.7056E-06 |
| C15 | -1.9417E-06 |
| C17 | -1.8278E-08 |
| C19 | 1.2447E-07 |
| C21 | 1.7523E-08 |
| C22 | 6.1211E-10 |
| C24 | -6.9304E-10 |
| C26 | 1.4859E-09 |
| C28 | 4.8433E-10 |
| C30 | 7.2389E-12 |
| C32 | -3.8764E-11 |
| C34 | -1.6595E-11 |
| C36 | -3.3449E-13 |
| C37 | -1.3657E-13 |
| C39 | 1.4026E-13 |
| C41 | -2.9312E-13 |
| C43 | -2.3637E-13 |
| C45 | -3.9507E-14 |
| C47 | -6.9844E-16 |
| C49 | 7.0885E-15 |
| C51 | 6.9612E-15 |
| C53 | 2.4919E-15 |
| C55 | 6.5428E-17 |
| C56 | 1.4330E-17 |
| C58 | 1.3597E-17 |
| C60 | 8.4166E-17 |
| C62 | 8.6819E-17 |
| C64 | 3.5818E-17 |
| C66 | 3.2204E-18 |

FIG. 66

TABLE 17

| DOT SIZE | 10.8um |
|---|---|
| HORIZONTAL LENGTH | 13.824mm |
| VERTICAL LENGTH | 8.64mm |
| OPTICAL AXIS − ELEMENT CENTER | 5.62mm |

FIG. 67

TABLE 18

| S | Y AXIS | Z AXIS | $\alpha$ |
|---|---|---|---|
| 30 | 0.00 | 42.83 | −45.00 |
| 31 | 79.13 | 51.06 | −99.28 |

FIG. 68A

TABLE 19A

APERTURE : 0.195

| S | R | D | Nd | Vd | GLASS NAME | MAKER | OPTICAL LENGTH |
|---|---|---|---|---|---|---|---|
| 1 | ∞ | 1.00 | | | | | – |
| 2 | ∞ | 1.00 | 1.51680 | 64.1983 | | | – |
| 3 | ∞ | 28.00 | | | | | – |
| 4* | 19.104 | 3.36 | 1.48749 | 70.2363 | S-FSL5 | OHARA | 1.06 |
| 5* | -59.219 | 4.87 | | | | | 1.79 |
| 6 | 65.515 | 1.10 | 1.90366 | 31.3150 | TAFD25 | HOYA | 3.38 |
| 7 | 21.339 | 4.73 | | | | | 3.56 |
| 8 | 33.736 | 0.90 | 1.80610 | 40.9260 | S-LAH53 | OHARA | 5.87 |
| 9 | 12.669 | 6.60 | 1.57099 | 50.7999 | S-BAL2 | OHARA | 6.16 |
| 10 | -19.530 | 0.30 | | | | | 7.17 |
| STOP | ∞ | 0.3 | | | | | 7.52 |
| 11* | 20.260 | 5.01 | 1.48749 | 70.2363 | S-FSL5 | HOYA | 7.91 |
| 12* | -19.231 | 0.30 | | | | | 7.92 |
| 13 | -101.061 | 1.00 | 1.81600 | 46.6206 | S-LAH59 | OHARA | 7.54 |
| 14 | 15.357 | 3.59 | | | | | 7.27 |
| 15 | -53.347 | 4.07 | 1.48749 | 70.2363 | S-FSL5 | OHARA | 7.65 |

FIG. 68B

TABLE 19B

| | | | | | |
|---|---|---|---|---|---|
| 16 | -12.523 | 1.30 | 1.83400 | 37.1605 | S-LAH60 | OHARA | 8.08 |
| 17 | -44.420 | 6.04 | | | | | 9.25 |
| 18 | 75.050 | 5.46 | 1.78470 | 26.2912 | S-TIH23 | OHARA | 13.28 |
| 19 | -47.973 | VARIABLE A | | | | | 13.65 |
| 20 | 39.285 | 3.21 | 1.68893 | 31.0755 | S-TIM28 | OHARA | 14.45 |
| 21 | 101.219 | VARIABLE B | | | | | 14.26 |
| 22 | -22.224 | 1.20 | 1.84666 | 23.7779 | S-TIH53 | OHARA | 13.88 |
| 23 | -51.455 | 3.33 | | | | | 14.99 |
| 24* | -32.301 | 3.50 | 1.53046 | 55.8000 | RESIN | | 15.35 |
| 25* | 45.881 | VARIABLE C | | | | | 17.99 |
| 26* | -25.694 | 4.61 | 1.53046 | 55.8000 | RESIN | | 19.38 |
| 27* | -30.137 | 1.23 | | | | | 20.74 |
| 28* | -56.076 | 4.00 | 1.53046 | 55.8000 | RESIN | | 20.96 |
| 29* | -33.474 | VARIABLE D | | | | | 21.71 |
| 30 | ∞ | -77.52 | REFLECTOR | | | | - |
| 31* | ∞ | VARIABLE E | REFLECTOR | | | | - |

FIG. 69

TABLE 20

FOCUSING

|  | NEAR DISTANCE | REF. | FAR DISTANCE |
|---|---|---|---|
| SCREEN SIZE | 48 INCH | 60 INCH | 80 INCH |
| VARIABLE A | 7.99 | 8.83 | 9.50 |
| VARIABLE B | 9.87 | 9.48 | 9.15 |
| VARIABLE C | 12.25 | 10.64 | 8.88 |
| VARIABLE D | 40.26 | 41.42 | 42.84 |
| VARIABLE E | 239.65 | 291.67 | 378.44 |

FIG. 70

TABLE 21

| S | K | A4 | A6 | A8 | A10 | A12 | A14 | A16 |
|---|---|---|---|---|---|---|---|---|
| 4 | 0.128 | -1.524E-05 | -1.354E-08 | 3.606E-09 | -9.315E-12 | | | |
| 5 | 0.0000 | 6.506E-05 | 5.344E-08 | 4.035E-09 | -8.619E-12 | | | |
| 11 | -0.553 | 2.915E-06 | -1.045E-07 | | | | | |
| 12 | -0.259 | 1.060E-05 | -1.378E-07 | | | | | |
| 24 | 0.218 | -4.461E-06 | -3.607E-08 | 2.427E-10 | -4.426E-13 | | | |
| 25 | -17.561 | -4.796E-05 | 9.057E-08 | -2.060E-10 | 3.064E-13 | -2.555E-16 | | |
| 26 | -0.679 | 5.769E-05 | -6.176E-07 | 2.233E-09 | -3.476E-12 | 1.990E-15 | | |
| 27 | -0.347 | 2.618E-05 | -2.053E-07 | 1.177E-10 | 1.201E-12 | -2.762E-15 | 1.801E-18 | |
| 28 | 1.937 | -9.800E-05 | 2.822E-07 | -1.144E-09 | 5.300E-12 | -1.297E-14 | 1.510E-17 | -6.711E-21 |
| 29 | -1.487 | -7.500E-05 | 1.931E-07 | -1.167E-09 | 5.554E-12 | -1.195E-14 | 1.186E-17 | -4.453E-21 |

FIG. 71

TABLE 22

| K | 0 |
|---|---|
| C4 | 1.2707E-02 |
| C6 | 9.0620E-03 |
| C8 | -1.3525E-05 |
| C10 | -1.6000E-04 |
| C11 | -1.5283E-06 |
| C13 | 1.6781E-06 |
| C15 | -2.0057E-06 |
| C17 | -1.7451E-08 |
| C19 | 1.2194E-07 |
| C21 | 1.7098E-08 |
| C22 | 5.7535E-10 |
| C24 | -7.1543E-10 |
| C26 | 1.4833E-09 |
| C28 | 4.9709E-10 |
| C30 | 6.5320E-12 |
| C32 | -3.9938E-11 |
| C34 | -1.6148E-11 |
| C36 | -3.8475E-13 |
| C37 | -1.2921E-13 |
| C39 | 1.3546E-13 |
| C41 | -3.1052E-13 |
| C43 | -2.3969E-13 |
| C45 | -4.1948E-14 |
| C47 | -5.8825E-16 |
| C49 | 7.3187E-15 |
| C51 | 7.1778E-15 |
| C53 | 2.4258E-15 |
| C55 | 1.1143E-16 |
| C56 | 1.3881E-17 |
| C58 | 1.5576E-17 |
| C60 | 8.8761E-17 |
| C62 | 9.1842E-17 |
| C64 | 3.6221E-17 |
| C66 | 3.9052E-18 |

FIG. 72

TABLE 23

| DOT SIZE | 10.8um |
|---|---|
| HORIZONTAL LENGTH | 13.824mm |
| VERTICAL LENGTH | 8.64mm |
| OPTICAL AXIS — ELEMENT CENTER | 5.62mm |

FIG. 73

TABLE 24

| S | Y AXIS | Z AXIS | $\alpha$ |
|---|---|---|---|
| 30 | 0.00 | 42.84 | −45.00 |
| 31 | 77.52 | 50.75 | −98.80 |

FIG. 74

TABLE 25

|       | EX. 1   | EX. 2   | EX. 3    | EX. 4    |
|-------|---------|---------|----------|----------|
| D1    | 21.560  | 21.912  | 22.232   | 21.714   |
| D2    | 15.846  | 17.161  | 17.392   | 16.884   |
| ds1   | −3.305  | −4.837  | −12.928  | −12.475  |
| ds2   | −1.852  | −2.829  | −7.738   | −7.923   |
| L     | 40.801  | 38.425  | 40.570   | 40.258   |
| Ymax  | 9.956   | 9.948   | 9.942    | 9.940    |
| f     | 21.389  | 19.330  | 22.456   | 21.611   |
| $\theta 1$ | 71.400  | 67.578  | 68.802   | 68.817   |
| $\theta 2$ | 20.680  | 22.422  | 22.519   | 22.447   |

FIG. 75

TABLE 26

|                          | EX. 1  | EX. 2   | EX. 3  | EX. 4  |
|--------------------------|--------|---------|--------|--------|
| CONDITIONAL EQUATION 1   | 0.122  | 0.187   | 0.030  | 0.043  |
| CONDITIONAL EQUATION 2   | 0.007  | −0.085  | 0.025  | 0.029  |
| CONDITIONAL EQUATION 3   | 0.088  | 0.102   | 0.028  | 0.047  |
| CONDITIONAL EQUATION 4   | 0.040  | −0.031  | 0.024  | 0.035  |
| CONDITIONAL EQUATION 5   | 6.29   | 6.75    | 6.67   | 6.73   |

PROJECTION OPTICAL SYSTEM INCLUDING MOVABLE LENS GROUPS AND IMAGE DISPLAY APPARATUS

CROSS-REFERENCE TO RELATED APPLICATIONS

This application is a continuation of and claims the benefit of priority under 35 U.S.C. § 120 from U.S. application Ser. No. 14/971,671 filed Dec. 16, 2015, which is a continuation of U.S. application Ser. No. 14/272,838 filed May 8, 2014 (now U.S. Pat. No. 9,261,767 issued Feb. 16, 2016), and claims the benefit of priority under 35 U.S.C. § 119 from Japanese Patent Application No. 2013-105851 filed May 20, 2013, the entire contents of each of which are incorporated by reference herein.

BACKGROUND

Technical Field

The present invention relates to a projection optical system, and an image display apparatus provided with the projection optical system.

Description of the Related Art

The image display apparatuses, such as projectors, are usually provided with a projection optical system that magnifies and projects an image on a projection plane such as a screen. Recently, a demand for a projector of which projection distance is extremely short and which can greatly magnify a display size of an image on a screen (can implement a large screen display), that is, a front projection type projector with an ultra-short projection distance has been increased. In addition, a request for miniaturization of the projector has also been increased.

SUMMARY

Example embodiments of the present invention include a projection optical system including: in order from a reduction side to a magnification side, an image forming unit configured to form an image thereon; a refraction optical system including a plurality of lenses, a first reflecting surface and a second reflecting surface. When, an optical axis shared by the largest number of lenses among optical axes of the plurality of the lenses of the refraction optical system is defined by an optical axis of the projection optical system, when in arrangement where a distance between an intersection of a magnification-side surface of a lens which is arranged to be closest to the magnification side of the refraction optical system and the optical axis and an intersection of the first reflecting surface and the optical axis has a minimum value, the distance between the intersections is denoted by L, when a focal length of the refraction optical system is denoted by f, when a direction parallel to the optical axis is defined by a Z axis direction, when an arrangement direction of the first reflecting surface and the second reflecting surface is defined by a Y axis direction, when a maximum value of a distance between the optical axis and an end portion of the image forming unit in the Y axis direction is denoted by Ymax, when in a YZ plane which is a plane parallel to the Y axis direction and the Z axis direction, a maximum value D1 of a distance between an intersection of a light beam path from the image forming unit and the magnification-side surface of the lens which is arranged to be closest to the magnification side of the refraction optical system and the optical axis, when a sag amount ds1 which is a sag amount of the magnification-side surface of the lens which is arranged to be closest to the magnification side of the refraction optical system at the D1 and of which positive direction is defined by the direction from the reduction side in the Z axis toward the magnification side, when a point H of which distance from the optical axis has a maximum value among the intersections of the light beam and the first reflecting surface, when a point F of which distance from the optical axis has a minimum value among the intersections of the light beam and the second reflecting surface, an angle θ1 between a line connecting the H and the F and the optical axis satisfies the condition 1: θ<Ymax/f−1/tan θ1; and condition 2: −0.1<(L−D1−ds1)/(L+D1−ds1)−1/tan θ1.

The above-described projection optical system may be applicable to any desired apparatus such as an image display apparatus.

BRIEF DESCRIPTION OF THE SEVERAL VIEWS OF THE DRAWINGS

FIG. 49 is example mathematical formula representing an aspherical surface and a free-form curved surface;

FIG. 50 is a table 1 illustrating examples of optical elements of the projection optical system of FIG. 3;

FIG. 51 is a table 2 illustrating examples of lens intervals during focusing in the projection optical system of FIG. 3;

FIG. 52 is a table 3 illustrating examples of numerical values of aspherical coefficients in the projection optical system of FIG. 3;

FIG. 53 is a table 4 illustrating examples of numerical values of free-form curved surface coefficients in the projection optical system of FIG. 3;

FIG. 54 is a table 5 illustrating characteristics of an image forming unit of the projection optical system of FIG. 3;

FIG. 55 is a table 6 illustrating examples of position coordinates and rotation angles of mirrors in the refraction optical system of FIG. 3;

FIGS. 56A and 56B are a table 7 illustrating examples of optical elements of the projection optical system of FIG. 15;

FIG. 57 is a table 8 illustrating examples of lens intervals during focusing in the projection optical system of FIG. 15;

FIG. 58 is a table 9 illustrating examples of numerical values of aspherical coefficients in the projection optical system of FIG. 15;

FIG. 59 is a table 10 illustrating examples of numerical values of free-form curved surface coefficients in the projection optical system of FIG. 15;

FIG. 60 is a table 11 illustrating characteristics of an image forming unit of the projection optical system of FIG. 15;

FIG. 61 is a table 12 illustrating examples of position coordinates and rotation angles of mirrors in the refraction optical system of FIG. 15;

FIGS. 62A and 62B are a table 13 illustrating examples of optical elements of the projection optical system of FIG. 26;

FIG. 63 is a table 14 illustrating examples of lens intervals during focusing in the projection optical system of FIG. 26;

FIG. 64 is a table 15 illustrating examples of numerical values of aspherical coefficients in the projection optical system of FIG. 26;

FIG. 65 is a table 16 illustrating examples of numerical values of free-form curved surface coefficients in the projection optical system of FIG. 26;

FIG. 66 is a table 17 illustrating characteristics of an image forming unit of the projection optical system of FIG. 26;

FIG. 67 is a table 18 illustrating examples of position coordinates and rotation angles of mirrors in the refraction optical system of FIG. 26;

FIGS. 68A and 68B are a table 19 illustrating examples of optical elements of the projection optical system of FIG. 37;

FIG. 69 is a table 20 illustrating examples of lens intervals during focusing in the projection optical system of FIG. 37;

FIG. 70 is a table 21 illustrating examples of numerical values of aspherical coefficients in the projection optical system of FIG. 37;

FIG. 71 is a table 22 illustrating examples of numerical values of free-form curved surface coefficients in the projection optical system of FIG. 37;

FIG. 72 is a table 23 illustrating characteristics of an image forming unit of the projection optical system of FIG. 37;

FIG. 73 is a table 24 illustrating examples of position coordinates and rotation angles of mirrors in the refraction optical system of FIG. 37;

FIG. 74 is a table 25 illustrating example numerical values representing the condition in each one of the above-described examples; and FIG. 75 is a table 26 illustrating example values representing each condition in each of the above-described examples.

DETAILED DESCRIPTION OF THE INVENTION

Hereinafter, a projection optical system and an image display apparatus according to embodiments of the present invention will be described with reference to the drawings. In the following, the image display apparatus is provided with the projection optical system, which projects an image formed at an image forming unit on a projection plane.

First Embodimnt of Image Display Apparatus

Figure 1:
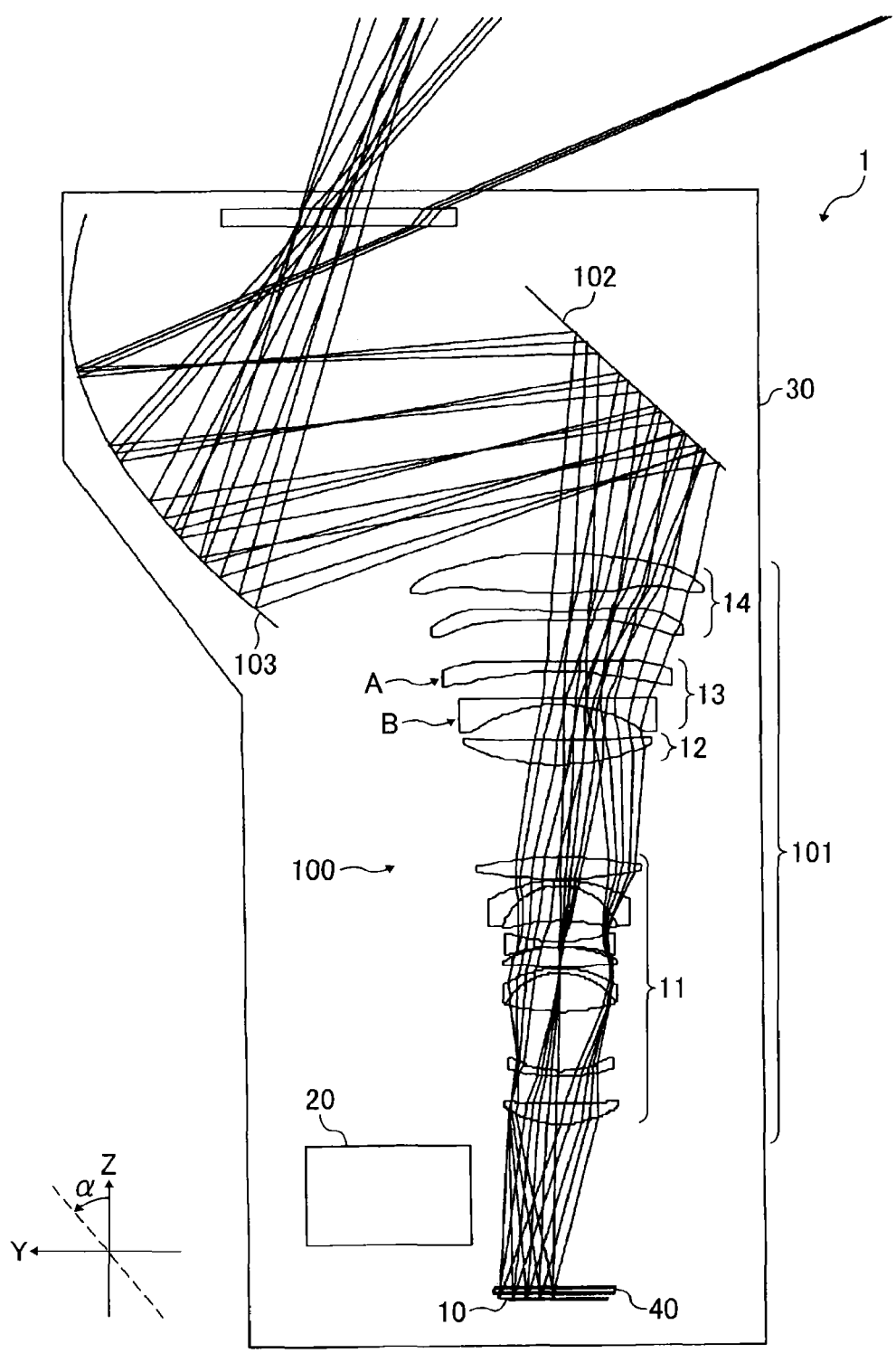
FIG. 1 is an optical layout diagram illustrating an image display apparatus according to an embodiment of the present invention.

FIG. 1 is an optical layout diagram illustrating a projector 1, which is one example of image display apparatus. The projector 1 includes an image forming unit 10, a parallel plate 40, a projection optical system 100, an illumination optical system 20 including a light source that illuminates the image forming unit 10 with illumination light, and other members used for image formation, which may be accommodated in a housing 30.

The image forming unit 10 may be implemented by any device capable of forming a to-be-projected image thereon, such as, a digital micromirror device (DMD), a transmission type liquid crystal panel, a reflection type liquid crystal panel, etc.

The parallel plate 40 is a cover glass (seal glass), which is arranged in the vicinity of the image forming unit 10 to protect the image forming unit 10.

The projection optical system 100 includes a refraction optical system 101, a plane mirror 102 functioning as a first reflecting surface, and a curved mirror 103 functioning as a second reflecting surface. As illustrated in FIG. 1, in this example, the plane mirror 102 is arranged such that the normal line of the plane mirror 102 is rotated by 45 degrees from the Z axis toward the Y axis direction on the YZ plane. The curved mirror 103 may be a concave mirror or a free-form curved surface mirror of which reflecting surface has a shape of a free-form curved surface. Details of the projection optical system 100 will be described later.

The illumination optical system 20 includes, for example, a rod integrator, a flyeye integrator, or the like in order to efficiently perform uniform illumination on the image forming unit 10. In addition, the illumination optical system 20 is provided with a light source. As the light source, a white light source such as an ultra-high pressure mercury lamp, a xenon lamp, a halogen lamp, and a light-emitting diode (LED) or a monochromatic light source such as a monochromatic light-emitting LED and a monochromatic light-emitting LD may be used.

In the below description, the image forming unit 10 is assumed to be an "image forming unit having no light-emission function" such as a DMD. However, the image forming unit applicable to this embodiment of the present invention is not limited thereto, but a "self-emission type image forming unit having a light-emission function of emitting light on a generated image" may be used.

The image forming unit 10 which is a DMD is illuminated with illumination light of the illumination optical system 20 and reflects the illumination light. Image information is formed by the reflected light. In other words, the image information generated by the DMD is a flux of light which is two-dimensionally intensity-modulated. The flux of light becomes a flux of projection light as object light. The image formed on the image forming unit 10 is magnified and projected on a screen.

The screen may be arranged to be perpendicular to the image forming unit 10. In other words, the normal line of an image formation plane of the image forming unit 10 is perpendicular to the normal line of the screen as a projection plane.

An intermediate image which is conjugate with the image information formed in the image forming unit 10 is formed by the light beam passing through the refraction optical system 101. The intermediate image is formed as a spatial image in the side closer to the image forming unit 10 than the plane mirror 102. In addition, the intermediate image is not necessarily formed as a plane image, but the intermediate image may be formed as a curved image.

The image is displayed on the screen by magnifying and projecting the intermediate image by using the curved mirror 103 which is arranged to be closest to the magnification side in the projection optical system 100. Although the intermediate image has a curvature of field or distortion, the reflecting surface of the curved mirror 103 is configured to have a shape of a free-form curved surface, so that it is possible to correct the curvature of field and the distortion. Accordingly, since a burden of aberration correction on the refraction optical system 101 is reduced, a degree of freedom in the design of the projection optical system 100 is increased, so that it is advantageous to miniaturization.

The refraction optical system 101 is configured so that the first lens unit 11 having a group of positive lenses, the plane mirror 102, and the curved mirror 103 are fixed with respect to the image forming unit 10 during focusing from a long distance side to a close range side. The second lens unit 12 having a group of positive lenses and the third lens unit 13 having a group of negative lenses are moved to the magnification side at one time and, after that, are moved to the image forming unit 10 side. The fourth lens unit 14 having a group of positive lenses, is moved to the magnification side during focusing from a long distance side to a close range side. In other words, the projection optical system 100 can control a curvature of field or distortion aberration at a high accuracy by performing floating focusing.

In the refraction optical system 101, an aspherical lens is arranged in the lens unit which is moved during focusing. With this configuration, the effect of the correction is further improved.

The projector 1 illustrated in FIG. 1 is an image display apparatus according to Example 1 described below. FIG. 1 is also an optical path diagram illustrating a case of 48-inch projector where the front lens elements provided to the projection optical system 100 are drawn out to the extreme degree. As clarified from FIG. 1, a sufficient interval between each lens and each light beam is maintained, so that interference between each light beam and each lens or a lens barrel (not illustrated) can be avoided in this state.

Figure 2:
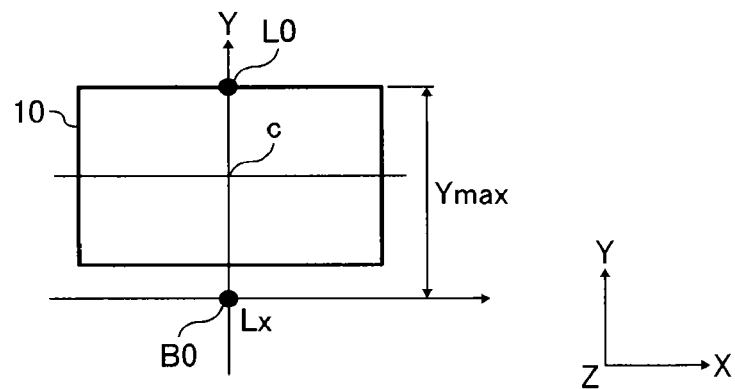
FIG. 2 is a plan view illustrating an image forming unit included in the image display apparatus of FIG. 1 as seen from an optical axis direction.

Next, the image forming unit included in the projection optical system according to an example embodiment of the present invention will be described. FIG. 2 is a plan view illustrating the image forming unit 10 according to the embodiment as seen from the image formation plane side. A plane in the image forming unit 10 on which the image information is formed is defined by an image formation plane. In FIG. 2, the image forming unit 10 is shifted in the Y axis direction with respect to the optical axis Lx described below. As illustrated in FIG. 2, the intersection of the Y direction axis line passing through a center C of the image forming unit 10 and the optical axis Lx is indicated by B0. The intersection of the Y direction axis line passing through the center C of the image forming unit 10 and the end portion of the image forming unit 10 is indicated by L0. The maximum value of the distance between the intersection BO and the intersection L0 is denoted by a symbol "Ymax". The distance Ymax is denoted by a maximum angle of view in the Y axis direction.

Figure 3:
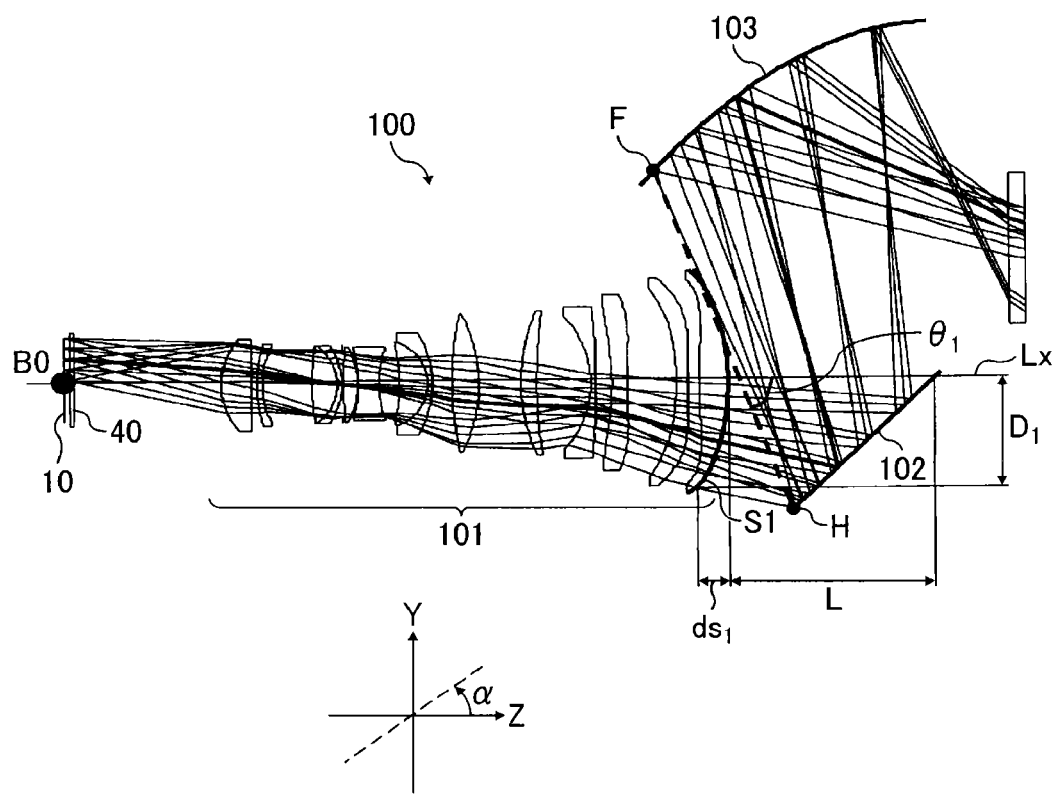
FIG. 3 is an optical layout diagram illustrating an example of a projection optical system included in the image display apparatus of FIG. 1.
Figure 4:
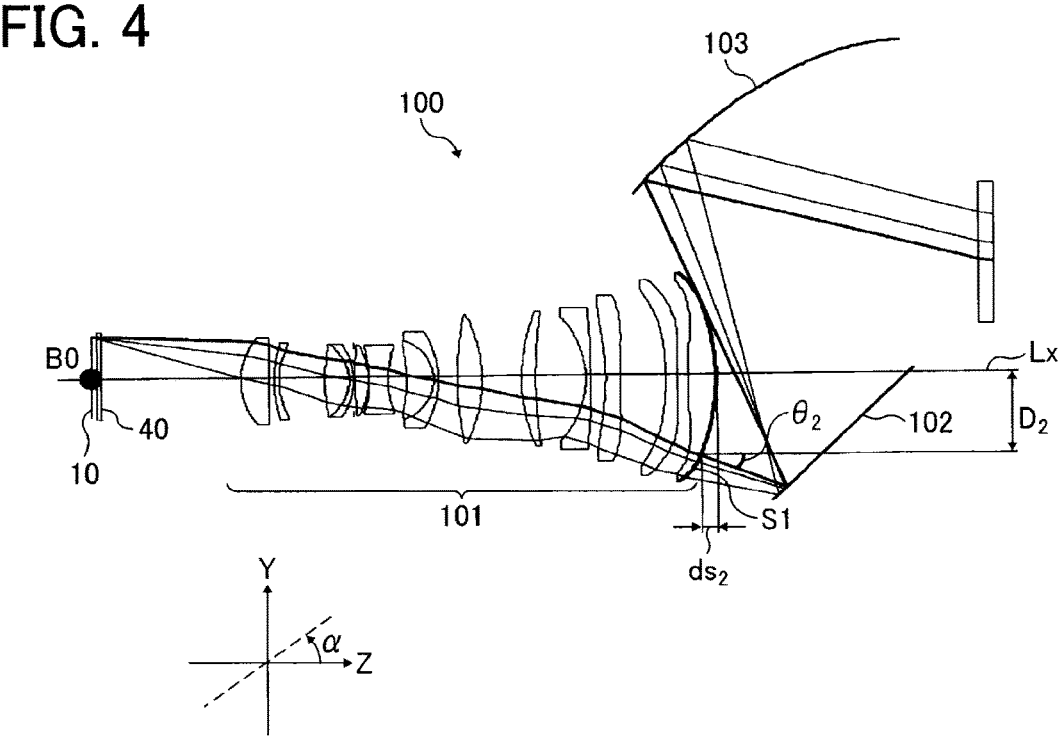
FIG. 4 is an optical layout diagram illustrating an example of a projection optical system included in the image display apparatus of FIG. 1.

Next, the projection optical system 100 according to the embodiment will be described in more detail. FIGS. 3 and 4 are optical layout diagrams of the projection optical system 100. As illustrated in FIGS. 3 and 4, the projection optical system 100 includes the image forming unit 10, the refraction optical system 101, the plane mirror 102 which is a first reflecting surface, and the curved mirror 103 which is a second reflecting surface.

Next, symbols for describing relations between optical elements in the present disclosure will be described with reference to FIGS. 3 and 4. FIGS. 3 and 4 are optical path diagrams illustrating optical paths of light beams projected from the image forming unit 10 to the screen.

As illustrated in FIGS. 3 and 4, an axis shared by the largest number of lenses among a plurality of the lenses constituting the refraction optical system 101 is defined by the optical axis Lx. The direction parallel to the optical axis Lx is defined by the Z axis direction; and the arrangement direction of the plane mirror 102 and the curved mirror 103 is defined by the Y axis direction. In other words, the direction perpendicular to the optical axis Lx on the plane including the light beam path passing through the center C (refer to FIG. 2) of the image forming unit 10, the center of a stop (not illustrated) included in the refraction optical system 101, and the center of the screen (not illustrated) is defined by the Y axis direction. In addition, the direction perpendicular to the Y axis direction and the Z axis direction is defined by the X axis direction.

FIGS. 3 and 4 are also cross-sectional views of the projection optical system 100 on the YZ plane. FIGS. 3 and 4 illustrate only the light beam paths parallel to the YZ plane among the light beams from the image forming unit 10. In addition, in FIGS. 3 and 4, the rotation from the +Z axis direction to the +Y axis direction on the YZ plane is defined by +α rotation.

As illustrated in FIG. 3, among lens surfaces of the lens which is arranged to be closest to the magnification side among the lenses included in the refraction optical system 101, the lens surface closer to the magnification side is denoted by "S1". In focusing, a minimum value of the distance between the intersection of the lens surface S1 and the optical axis Lx and the intersection of the plane mirror 102 and the optical axis Lx is denoted by "L". When the L has a minimum value, among the intersections of the plane mirror 102 and the light beam paths parallel to the YZ cross section, the point on the plane mirror 102 of which distance from the optical axis Lx has a maximum value is denoted by "H". Among the intersections of the curved mirror 103 and the light beam paths parallel to the YZ cross section, the point on the curved mirror 103 of which distance from the optical axis Lx has a minimum value is denoted by "F". In addition, an angle between the segment connecting the point H and the point F and the optical axis Lx is denoted by θ1.

Among the intersections of the light beam paths parallel to the YZ cross section and the surface S1, the distance between the point on the surface Si of which distance from the optical axis Lx has a maximum value and the optical axis Lx is denoted by "D1". Further, a sag amount of the surface S1 at the distance D1 from the top of the lens surface S1 is denoted by "ds1". The positive direction of the sag amount ds1 is defined by the direction from the reduction side to the magnification side. In other words, in this disclosure, the sag amount of the surface S1 may be referred to as a surface sag indicating the height of the surface S1.

Among the light beams illustrated in FIG. 4, the light beam indicated by the thick solid black line is an upper light beam at the maximum angle of view in the Y axis direction. The distance between the intersection of the upper light beam and the surface S1 and the optical axis Lx is denoted by "D2". The sag amount of the surface S1 at the distance D2 is denoted by "ds2". Further, an angle between the light beam emitted from the refraction optical system 101 for the upper light beam and the optical axis Lx is denoted by θ2.

Among the symbols described above, the meanings of the symbols representing the positional relation between the optical elements constituting the projector 1 are the same in each example described below.

Next, specific numerical examples of the projection optical system 100 will be described. First, meanings of symbols used in each example will be described. The meanings of symbols are as follows.

f: focal distance of the entire system of the projection optical system 100
NA: aperture efficiency
ω: half angle of view (deg)
R: radius of curvature (paraxial radius of curvature of an aspheric surface)
D: surface interval
Nd: refractive index
vd (Vd): Abbe number
K: conic constant of an aspheric surface
Ai: i-th order aspherical constant
Cj: free-form curved surface coefficient
C: reciprocal of paraxial radius of curvature (paraxial curvature)
H: height from optical axis
K: conic constant A shape of an aspherical surface is represented as an aspherical amount X in the optical axis direction by the Mathematical Formula 1 (Equation 1) illustrated in FIG. 49 using the paraxial curvature C, the height H from the optical axis, the conic constant K, and the i-th order aspherical constants Ai.

The shape of an aspherical surface is specified by applying the paraxial curvature C, the conic constant K, and the aspherical constants Ai to the aforementioned Mathematical Formula 1.

A shape of a free-form curved surface is expressed as a free-form curved surface amount X in the optical axis direction by the Mathematical Formula 2 (Equation 2) illustrated in FIG. 49 using the paraxial curvature C, the height H from an optical axis, the conic constant K, and the free-form curved surface coefficients Cj. Herein, j is represented by the Mathematical Formula 3 (Equation 3) illustrated in FIG. 49.

The shape of a free-form curved surface is specified by applying the paraxial curvature C, the conic constant K, and the free-form curved surface coefficients Cj to the aforementioned Mathematical Formula 2.

EXAMPLE 1

Figure 5:
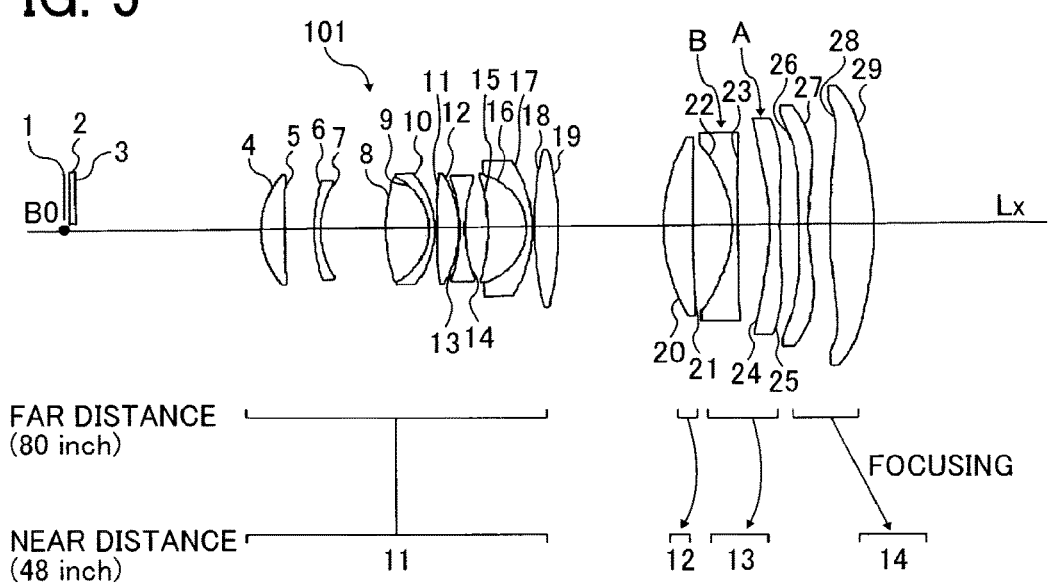
FIG. 5 is an optical layout diagram illustrating a moving locus of each of lens units constituting the projection optical system of FIG. 3 during focusing.

FIG. 5 is an optical layout diagram illustrating the refraction optical system 101 according to this example. As illustrated in FIG. 5, the refraction optical system 101 includes a first lens unit 11, a second lens unit 12, a third lens unit 13, and a fourth lens unit 14.

In FIG. 5, each solid line represents a moving locus of each of the lens units constituting the refraction optical system 101 during focusing from a long distance side (far distance) to a close range side (near distance). In addition, the long distance side is defined by the case where an image size projected on a screen is 80 inches; and the close range side is defined by the case where the image size is 48 inches.

The first lens unit 11 is configured to include, in order from the image forming unit 10 side, a both-side aspherical biconvex lens having a stronger convex surface toward the image forming unit 10 side, a negative meniscus lens having a convex surface toward the image forming unit 10 side, a cemented lens of a biconvex lens having a stronger convex surface toward the magnification side and a negative meniscus lens having a convex surface toward the magnification side, an aperture stop (not illustrated), a biconvex lens having a stronger convex surface toward the magnification side, a biconcave lens having a stronger concave surface at the magnification side, a cemented lens of a positive meniscus lens having a convex surface toward the magnification side and a negative meniscus lens having a convex surface toward the magnification side, and a biconvex lens having a stronger convex surface toward the magnification side.

The second lens unit 12 is configured with a positive meniscus lens having a convex surface toward the image forming unit 10 side.

The third lens unit 13 is configured to include a biconcave lens B having a stronger concave surface toward the image forming unit 10 side and a both-side aspherical biconcave lens A having a stronger concave surface toward the image forming unit 10 side and having a shape that has a negative power on the axis and a positive power in the periphery.

The fourth lens unit 14 is configured to include a both-side aspherical negative meniscus lens having a convex surface toward the image forming unit 10 side and having a shape that has a negative power on the axis and a positive power in the periphery and a both-side aspherical biconvex lens having a stronger convex surface toward the magnification side and having a shape that has a positive power on the axis and a negative power in the periphery.

Table 1 illustrated in FIG. 50 lists data representing examples of optical elements included in the projection optical system 100 according to Example 1.

In the table, S denotes each lens surface of the refraction optical system 101 as indicated by the numeral in FIG. 5. Further, a light beam distance, or an optical length, denotes a distance between a lower light beam at the maximum angle of view in the Y axis direction on each surface and the optical axis Lx.

Table 2 illustrated in FIG. 51 represents a specific example of lens intervals during focusing in the projection optical system 100 according to this example.

Table 3 illustrated in FIG. 52 represents a specific example of numerical values of aspherical coefficients in the projection optical system 100 according to this example. The aspherical surface is expressed by the above-described Mathematical Formula 1 (Equation 1) illustrated in FIG. 49.

Table 4 illustrated in FIG. 53 represents a specific example of numerical values of free-form curved surface coefficients in the projection optical system 100 according to this example. The free-form curved surface is expressed by the above-described Mathematical Formula 2 (Equation 2) illustrated in FIG. 49.

Table 5 illustrated in FIG. 54 represents a specific example of a DMD used as the image forming unit 10 in the projection optical system 100 according to this example.

Table 6 illustrated in FIG. 55 represents a specific example of position coordinates and angles of α rotation of the plane mirror 102 and the curved mirror 103 from the vertex of the lens located to be closest to the plane mirror 102 side among the lenses included in the refraction optical system 101 in the focus state where the projected image has a maximum size. The rotation represents the angle between the normal line of the surface and the optical axis Lx.

Next, suppression of a deterioration in image quality at each projection distance in the projection optical system 100 according to the example will be described with reference to FIGS. 6 to 11C. FIGS. 6 to 11C are diagrams of images illustrating positions of main light beams having a wavelength of 550 nm and diagrams illustrating distortion of an image at each angle of view when the image representing the positions of the main light beams is displayed on the screen with respect to each zoom position and each projection distance in the projection optical system 100 according to Example 1.

Figure 6:
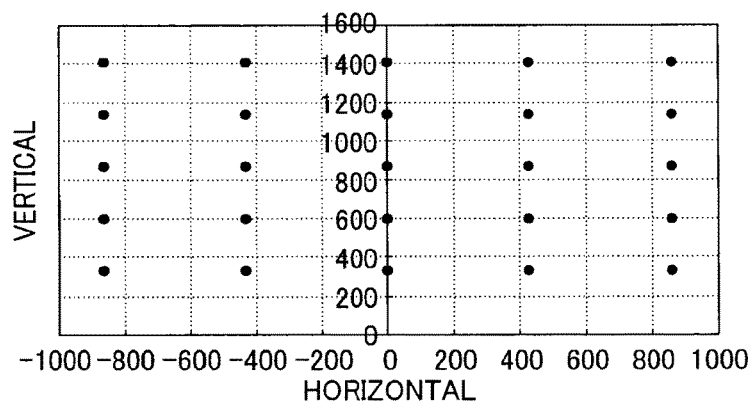
FIG. 6 is a diagram illustrating an example of an image on a screen in a long distance projection period of the projection optical system of FIG. 3.
Figure 7A:
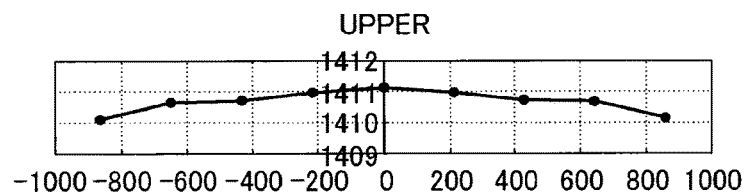
FIG. 7A is a diagram illustrating distortion in the upper side of the image exemplified in FIG. 6.
Figure 7B:
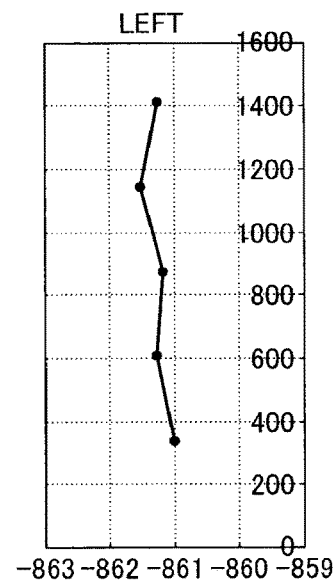
FIG. 7B is a diagram illustrating distortion in the left end of the image exemplified in FIG. 6.
Figure 7C:
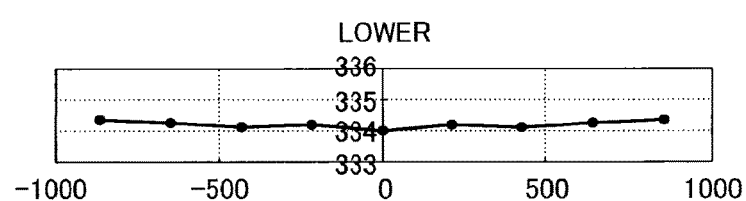
FIG. 7C is a diagram illustrating distortion in the lower end of the image exemplified in FIG. 6.

FIG. 6 illustrates an example of an image representing positions of spots having a wavelength of 550 nm displayed on the screen in the projection optical system 100 in a long distance projection period. FIG. 7A is a diagram illustrating distortion in the upper side of the image exemplified in FIG. 6. FIG. 7B is a diagram illustrating distortion in the left end of the image exemplified in FIG. 6. FIG. 7C is a diagram illustrating distortion in the lower end of the image exemplified in FIG. 6.

Figure 8:
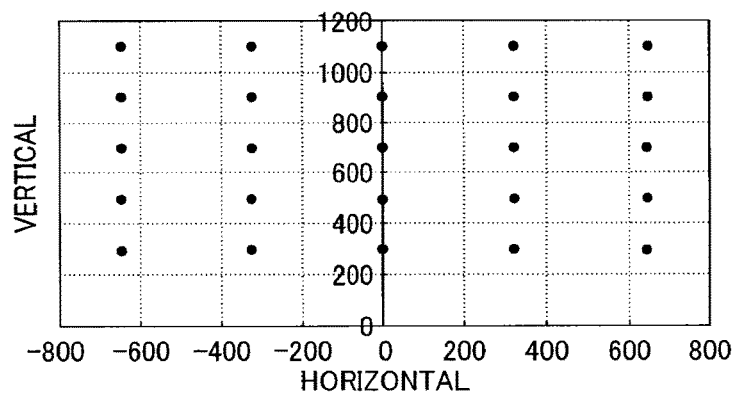
FIG. 8 is a diagram illustrating an example of an image on a screen in a reference distance projection period of the projection optical system of FIG. 3.
Figure 9A:
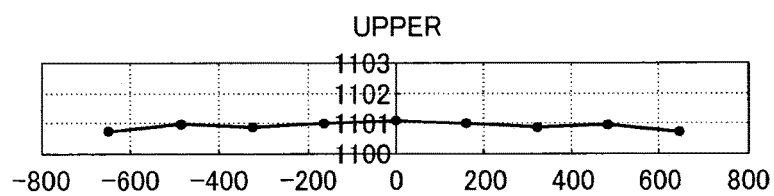
FIG. 9A is a diagram illustrating distortion in the upper side of the image exemplified in FIG. 8.
Figure 9B:
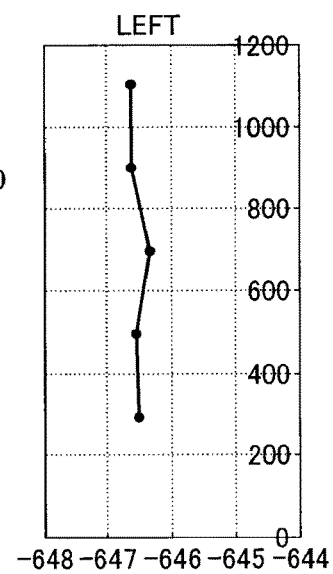
FIG. 9B is a diagram illustrating distortion in the left end of the image exemplified in FIG. 8.
Figure 9C:
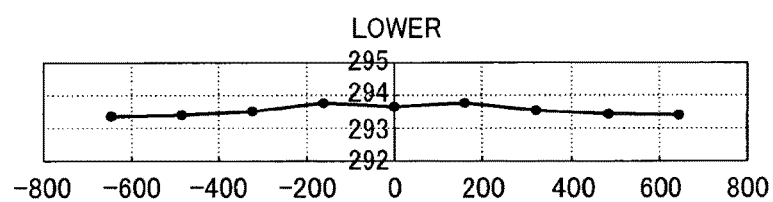
FIG. 9C is a diagram illustrating distortion in the lower end of the image exemplified in FIG. 8.

FIG. 8 illustrates an example of an image representing positions of spots having a wavelength of 550 nm displayed on the screen in the projection optical system 100 in a reference distance projection period. FIG. 9A is a diagram illustrating distortion in the upper side of the image exemplified in FIG. 8. FIG. 9B is a diagram illustrating distortion in the left end of the image exemplified in FIG. 8. FIG. 9C is a diagram illustrating distortion in the lower end of the image exemplified in FIG. 8.

Figure 10:
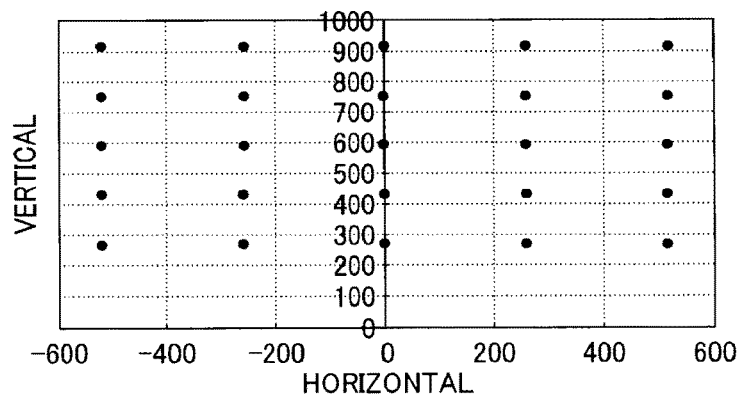
FIG. 10 is a diagram illustrating an example of an image on a screen in a close range projection period of the projection optical system of FIG. 3.
Figure 11A:
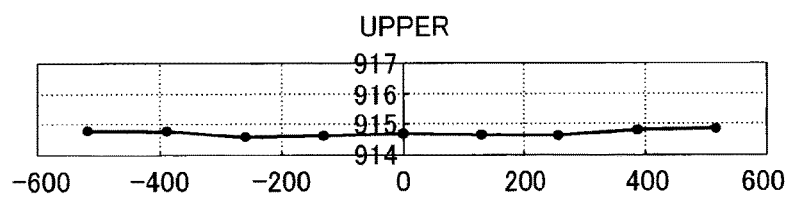
FIG. 11A is a diagram illustrating distortion in the upper side of the image exemplified in FIG. 10.
Figure 11B:
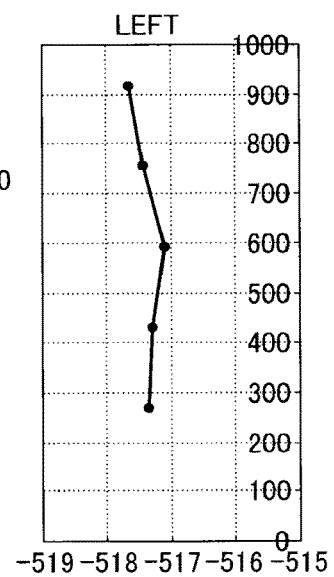
FIG. 11B is a diagram illustrating distortion in the left end of the image exemplified in FIG. 10.
Figure 11C:
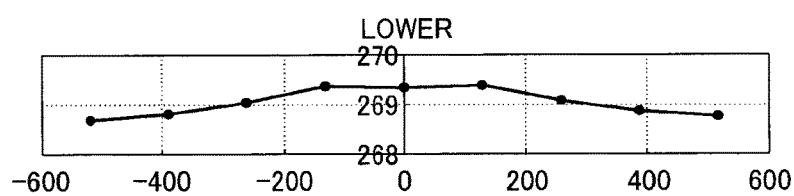
FIG. 11C is a diagram illustrating distortion in the lower end of the image exemplified in FIG. 10.

FIG. 10 illustrates an example of an image representing positions of spots having a wavelength of 550 nm displayed on the screen in the projection optical system 100 in a close range projection period. FIG. 11A is a diagram illustrating distortion in the upper side of the image exemplified in FIG. 10. FIG. 11B is a diagram illustrating distortion in the left end of the image exemplified in FIG. 10. FIG. 11C is a diagram illustrating distortion in the lower end of the image exemplified in FIG. 10.

Hereinbefore, as illustrated in FIGS. 6 to 11C, in the projection optical system 100 according to this example, it is possible to project an image having small distortion with respect to each zoom position and each projection distance.

Figure 12:
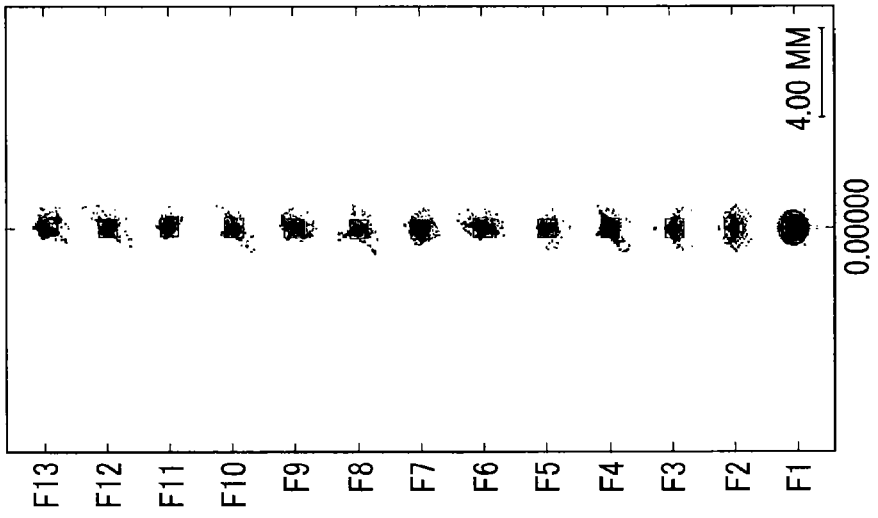
FIG. 12 is a spot diagram in the long distance projection period of the projection optical system of FIG. 3.
Figure 13:
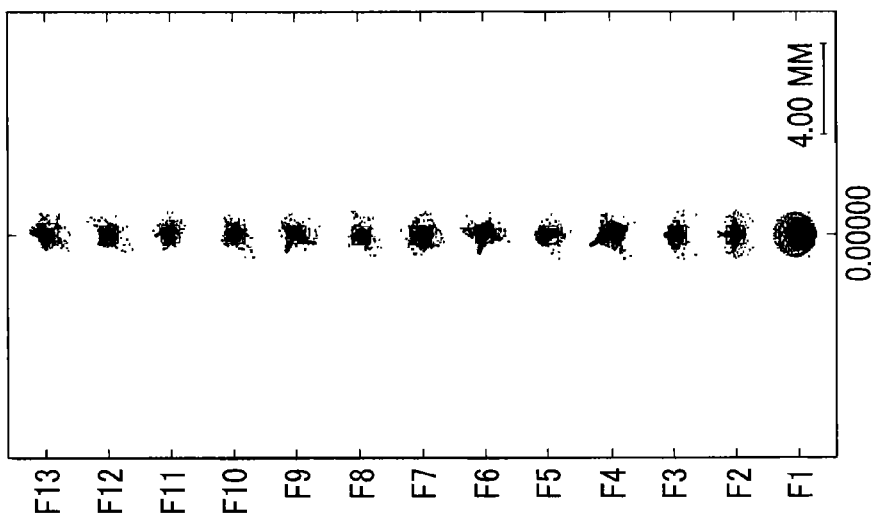
FIG. 13 is a spot diagram in the reference distance projection period of the projection optical system of FIG. 3.
Figure 14:
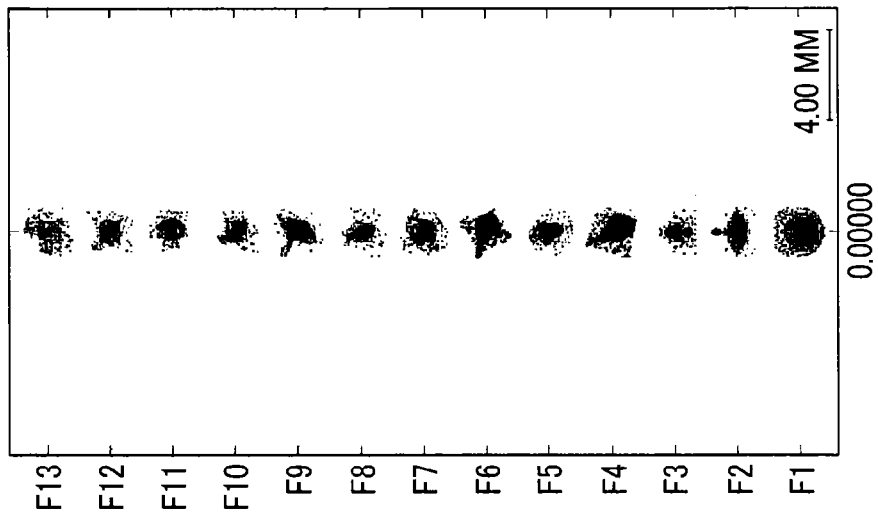
FIG. 14 is a spot diagram in the close range projection period of the projection optical system of FIG. 3.
Figure 48:
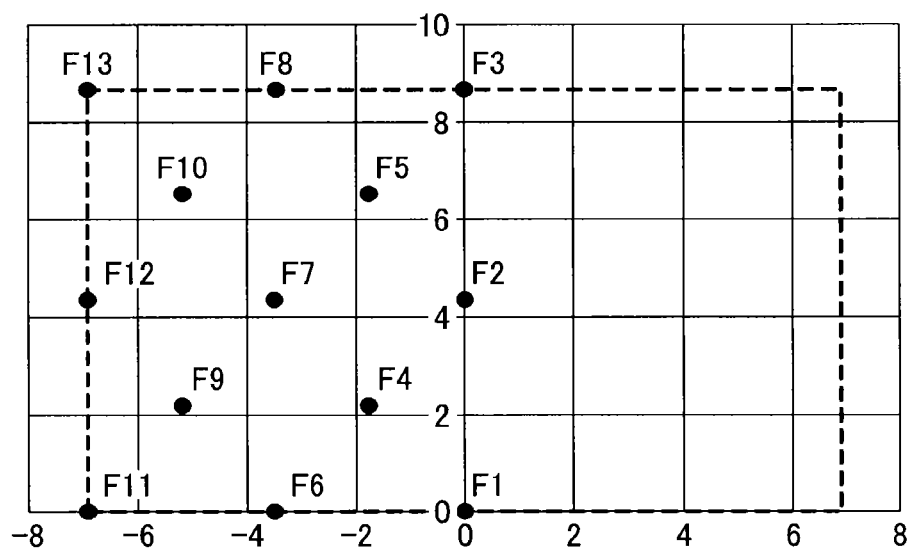
FIG. 48 is a diagram illustrating field positions corresponding to angles of view of the image forming unit according to an embodiment of the present invention.

Next, it is described that a change in an image is suppressed during zooming at each angle of view by using spot diagrams in the projection optical system 100 according to the example with reference to FIGS. 12 to 14. The spots in each of the spot diagrams illustrated in FIGS. 12 to 14 correspond to field positions indicated by F1 to F13 illustrated in FIG. 48. Each spot diagram illustrates image formation characteristics (mm) on the screen plane with respect to wavelengths of 625 nm (red), 550 nm (green), and 425 nm (blue).

FIG. 12 is a spot diagram in the long distance projection period. FIG. 13 is a spot diagram in the reference distance projection period. FIG. 14 is a spot diagram in the close range projection period.

As illustrated in FIGS. 12 to 14, according to the projection optical system 100 of this example, a variation in image quality at each zoom position and each projection distance is suppressed.

Second Embodiment of Image Display Apparatus

Next, another embodiment of the image display apparatus according to the present invention will be described. In the following description, the same components are denoted by the same reference numerals, and the detailed description thereof is not repeated.

Figure 15:
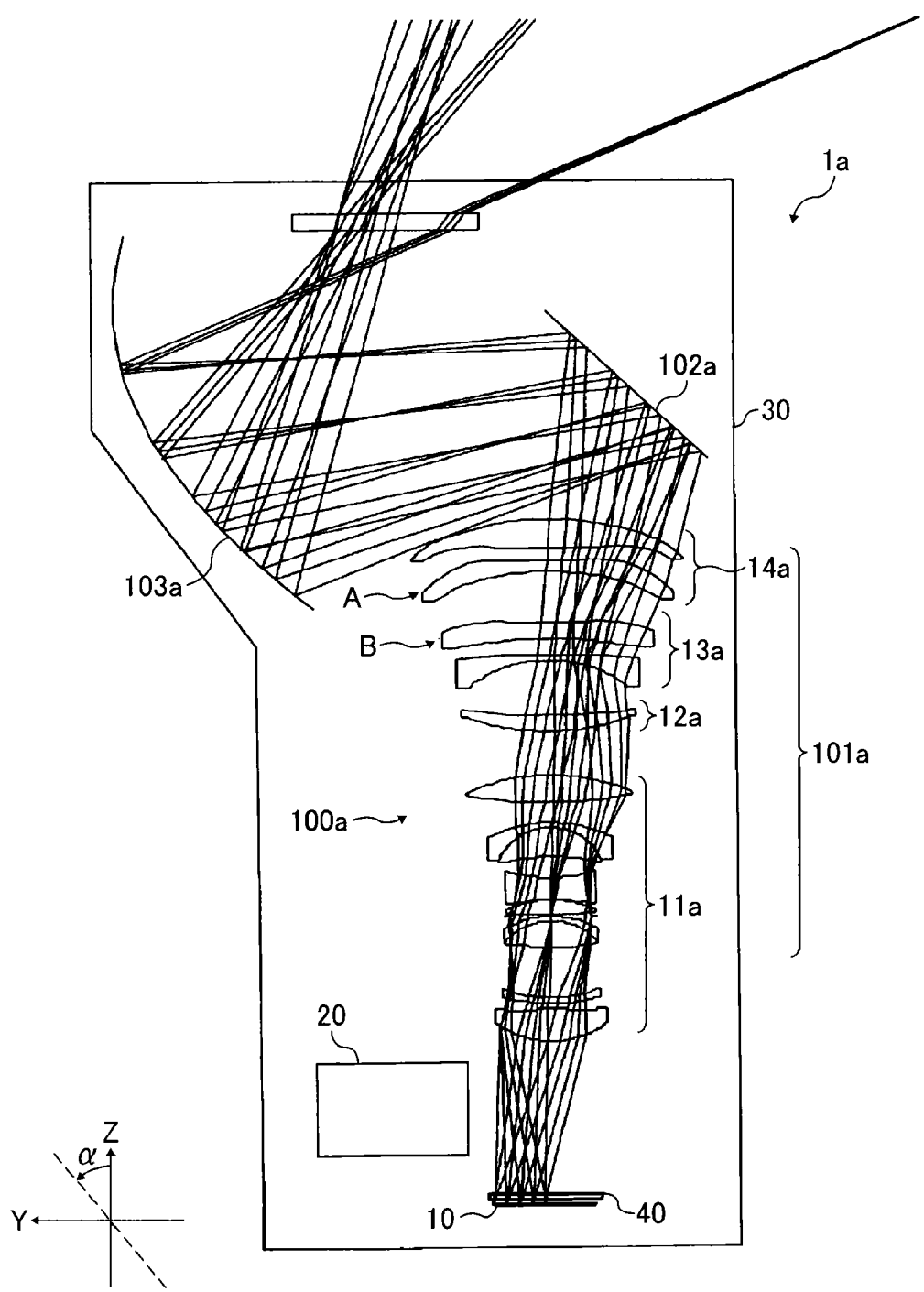
FIG. 15 is an optical layout diagram illustrating an image display apparatus according to another embodiment of the present invention.

FIG. 15 is an optical layout diagram illustrating a projector 1a according to an embodiment of the present invention. In FIG. 15, the projector 1a includes the image forming unit 10, the parallel plate 40, a projection optical system 100a, the illumination optical system 20 including a light source which illuminates the image forming unit 10 with illumination light, and other members used for image formation, which may be accommodated in the housing 30.

The projection optical system 100a includes a refraction optical system 101a, a plane mirror 102a which is a first reflecting surface, and a curved mirror 103a which is a second reflecting surface. As illustrated in FIG. 15, the plane mirror 102a is arranged such that the normal line of the plane mirror 102a is rotated by 45 degrees from the Z axis towards the Y axis direction on the YZ plane. The curved mirror 103a may be a concave mirror or a free-form curved surface mirror of which reflecting surface has a shape of a free-form curved surface.

As described above in the case of First Embodiment, the image formed on the image forming unit 10 is magnified and projected on a screen (not illustrated).

The screen (not illustrated) is arranged to be perpendicular to the image forming unit 10. In other words, the normal line of an image formation plane of the image forming unit 10 is perpendicular to the normal line of the screen as a projection plane.

An intermediate image which is conjugate with the image information formed in the image forming unit 10 is formed by the light beam passing through the refraction optical system 101a. The intermediate image is formed as a spatial image in the side closer to the image forming unit 10 than the plane mirror 102a. The intermediate image is not necessarily formed as a plane image, but the intermediate image may be formed as a curved image.

The image is displayed on the screen by magnifying and projecting the intermediate image by using the curved mirror 103a which is arranged to be closest to the magnification side in the projection optical system 100a. Although the intermediate image has a curvature of field or distortion, the reflecting surface of the curved mirror 103a is configured to have a shape of a free-form curved surface, so that it is possible to correct the curvature of field and the distortion. Accordingly, since a burden of aberration correction on the refraction optical system 101a is reduced, a degree of freedom in the design of the projection optical system 100a is increased, so that it is advantageous in miniaturization.

The refraction optical system 101a is configured so that the first lens unit 11a having a group of lenses with a positive refractive power, the plane mirror 102a, and the curved mirror 103a are fixed to the image forming unit 10 during focusing from a long distance side to a close range side. The second lens unit 12a which is a lens unit having a positive refractive power and the third lens unit 13a which is a lens unit having a negative refractive power are moved to the image forming unit 10 side. The fourth lens unit 14a which is a lens unit having a positive refractive power is moved to the magnification side. In other words, the projection optical system 100a can control a curvature of field or distortion aberration with high accuracy by performing floating focusing.

Further, since the refraction optical system 101a is configured so that an aspherical lens is arranged in the lens unit which is moved during focusing, it is possible to improve the effect of the correction.

The projector 1a illustrated in FIG. 15 is an image display apparatus according to Example 2 described below. FIG. 15 is also an optical path diagram illustrating a case of 48-inch projector where the front lens elements provided to the projection optical system 100a are drawn out to the extreme degree. In this disclosure, the front lens elements correspond to a lens which is arranged to be closest to the magnification side of the refraction optical system. As clarified from FIG.

15, a sufficient interval between each lens and each light beam is maintained, so that interference between each light beam and each lens or a lens barrel (not illustrated) can be avoided in this state.

EXAMPLE 2

Figure 16:
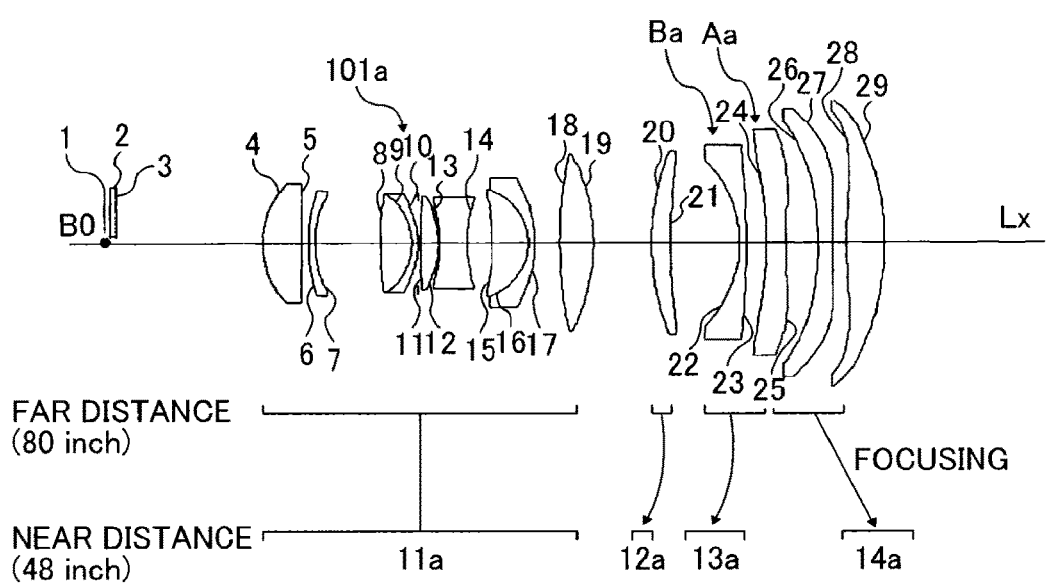
FIG. 16 is an optical layout diagram illustrating a moving locus of each of lens units constituting a projection optical system of FIG. 15 during focusing.

FIG. 16 is an optical layout diagram illustrating a refraction optical system 101a included in the projection optical system 100a according to this example. As illustrated in FIG. 16, the refraction optical system 101a includes, in order from the image forming unit 10 side, a first lens unit 11a, a second lens unit 12a, a third lens unit 13a, and a fourth lens unit 14a.

In FIG. 16, each solid line represents a moving locus of each of the lens units constituting the refraction optical system 101a during focusing from a long distance side (far distance) to a close range side (near distance). In addition, the long distance side is defined by the case where an image size projected on a screen is 80 inches; and the close range side is defined by the case where the image size is 48 inches.

The first lens unit 11a is configured to include, in order from the image forming unit 10 side, a both-side aspherical biconvex lens having a stronger convex surface toward the image forming unit 10 side, a negative meniscus lens having a convex surface toward the image forming unit 10 side, a cemented lens of a biconvex lens having a stronger convex surface toward the magnification side and a negative meniscus lens having a convex surface toward the magnification side, an aperture stop (not illustrated), a biconvex lens having a stronger convex surface toward the magnification side, a biconcave lens having a stronger concave surface at the magnification side, a cemented lens of a positive meniscus lens having a convex surface toward the magnification side and a negative meniscus lens having a convex surface toward the screen side, and a biconvex lens having a stronger convex surface toward the magnification side.

The second lens unit 12a is configured with a positive meniscus lens having a convex surface toward the image forming unit 10 side.

The third lens unit 13a is configured to include a negative meniscus lens Ba having a convex surface toward the magnification side and a both-side aspherical biconcave lens Aa having a stronger concave surface toward the image forming unit 10 side and having a shape that has a negative power on the optical axis Lx and a positive power in the periphery.

The fourth lens unit 14a is configured to include a both-side aspherical biconcave lens having a stronger concave surface toward the image forming unit 10 side and having a shape that has a negative power on the optical axis Lx and a positive power in the periphery and a both-side aspherical biconvex lens having a stronger convex surface toward the magnification side and having a shape that has a positive power on the optical axis Lx and a negative power in the periphery.

Table 7 (Tables 7A and 7B) illustrated in FIGS. 56A and 56B lists data representing examples of optical elements included in the projection optical system 100a of FIG. 15 according to Example 2. In the table, S denotes each lens surface of the refraction optical system 101a as indicated by the numeral in FIG. 16. Further, a light beam distance, or an optical length, denotes a distance between a lower light beam at the maximum angle of view in the Y axis direction on each surface and the optical axis Lx.

Table 8 illustrated in FIG. 57 represents a specific example of lens intervals during focusing in the projection optical system 100a according to this example.

Table 9 illustrated in FIG. 58 represents a specific example of numerical values of aspherical coefficients in the projection optical system 100a according to this example. The aspherical surface is expressed by the above-described Mathematical Formula 1 (Equation 1) illustrated in FIG. 49.

Table 10 illustrated in FIG. 59 represents a specific example of numerical values of free-form curved surface coefficients in the projection optical system 100a according to this example. The free-form curved surface is expressed by the above-described Mathematical Formula 2 (Equation 2) illustrated in FIG. 49.

Table 11 illustrated in FIG. 60 represents a specific example of a DMD used as the image forming unit 10 in the projection optical system 100a according to this example.

Table 12 illustrated in FIG. 61 represents a specific example of position coordinates and angles of α rotation of the plane mirror 102a and the curved mirror 103a from the vertex of the lens located to be closest to the plane mirror 102a side among the lenses included in the refraction optical system 101a in the focus state where the projected image has a maximum size. The rotation represents the angle between the normal line of the surface and the optical axis Lx.

Next, suppression of a deterioration in image quality at each projection distance in the projection optical system 100a according to this example will be described with reference to FIGS. 17 to 22C. FIGS. 17 to 22C are diagrams illustrating positions of main light beams having a wavelength of 550 nm and diagrams illustrating distortion of an image at each angle of view when the image representing the positions of the main light beams is displayed on the screen with respect to each zoom position and each projection distance in the projection optical system 100a according to Example 2.

Figure 17:
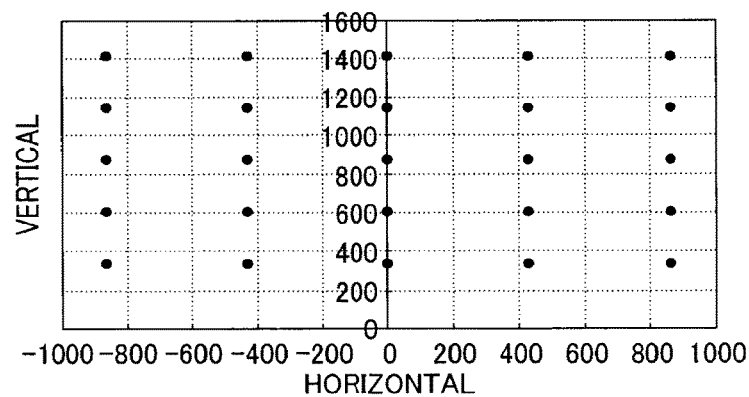
FIG. 17 is a diagram illustrating an example of an image on a screen in a long distance projection period of the projection optical system of FIG. 15.
Figure 18A:
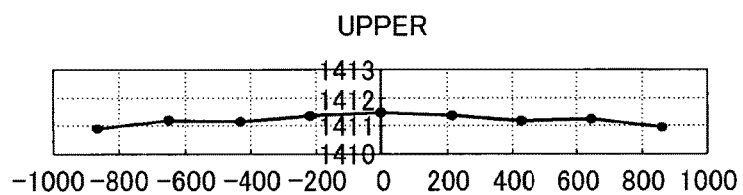
FIG. 18A is a diagram illustrating distortion in the upper side of the image exemplified in FIG. 17.
Figure 18B:
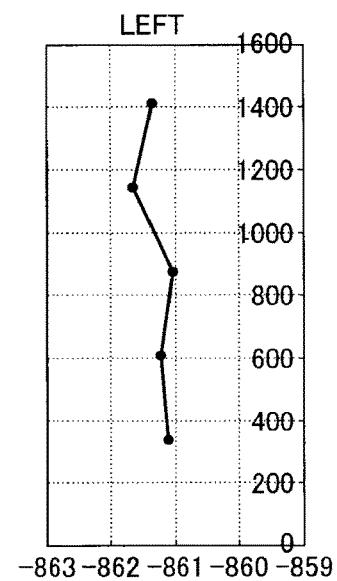
FIG. 18B is a diagram illustrating distortion in the left end of the image exemplified in FIG. 17.
Figure 18C:
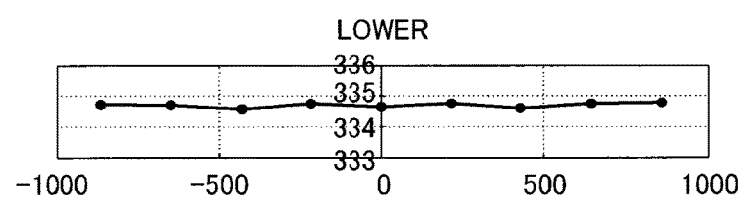
FIG. 18C is a diagram illustrating distortion in the lower end of the image exemplified in FIG. 17.

FIG. 17 illustrates an example of an image representing positions of spots having a wavelength of 550 nm displayed on the screen in the projection optical system 100a in a long distance projection period. FIG. 18A is a diagram illustrating distortion in the upper side of the image exemplified in FIG. 17. FIG. 18B is a diagram illustrating distortion in the left end of the image exemplified in FIG. 17. FIG. 18C is a diagram illustrating distortion in the lower end of the image exemplified in FIG. 17.

Figure 19:
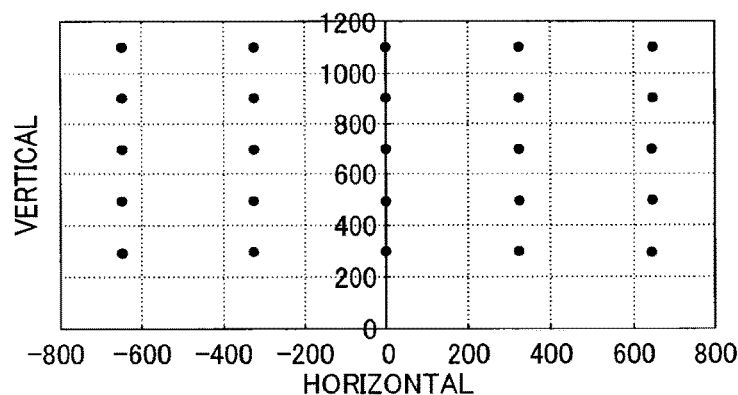
FIG. 19 is a diagram illustrating an example of an image on a screen in a reference distance projection period of the projection optical system of FIG. 15.
Figure 20A:
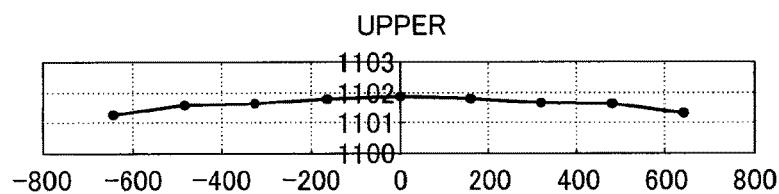
FIG. 20A is a diagram illustrating distortion in the upper side of the image exemplified in FIG. 19.
Figure 20B:
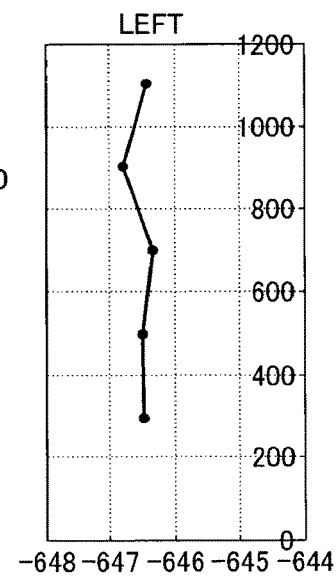
FIG. 20B is a diagram illustrating distortion in the left end of the image exemplified in FIG. 19.
Figure 20C:
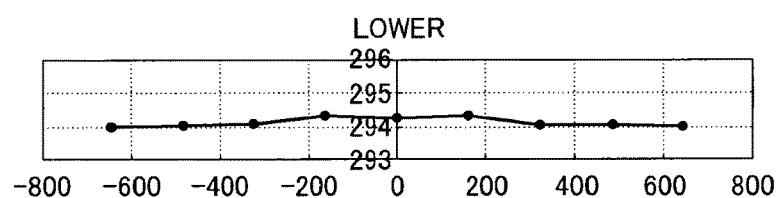
FIG. 20C is a diagram illustrating distortion in the lower end of the image exemplified in FIG. 19.

FIG. 19 illustrates an example of an image representing positions of spots having a wavelength of 550 nm displayed on the screen in the projection optical system 100a in a reference distance projection period. FIG. 20A is a diagram illustrating distortion in the upper side of the image exemplified in FIG. 19. FIG. 20B is a diagram illustrating distortion in the left end of the image exemplified in FIG. 19. FIG. 20C is a diagram illustrating distortion in the lower end of the image exemplified in FIG. 19.

Figure 21:
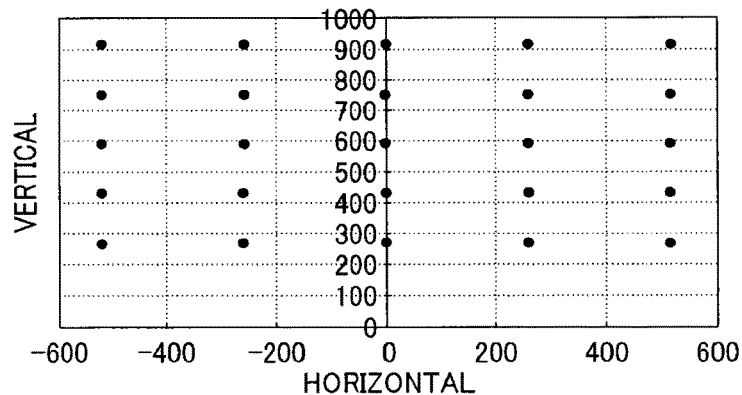
FIG. 21 is a diagram illustrating an example of an image on a screen in a close range projection period of the projection optical system of FIG. 15.
Figure 22A:
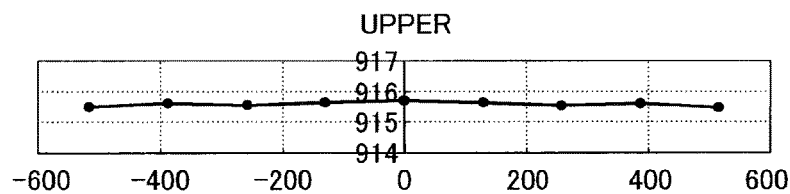
FIG. 22A is a diagram illustrating distortion in the upper side of the image exemplified in FIG. 21.
Figure 22B:
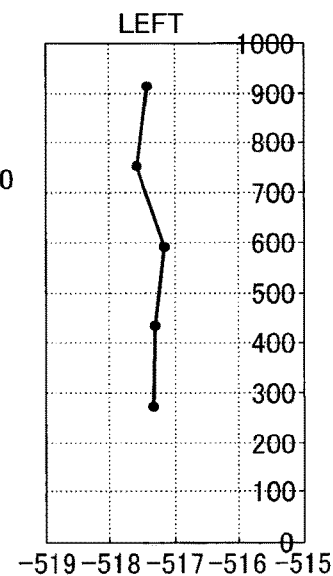
FIG. 22B is a diagram illustrating distortion in the left end of the image exemplified in FIG. 21.
Figure 22C:
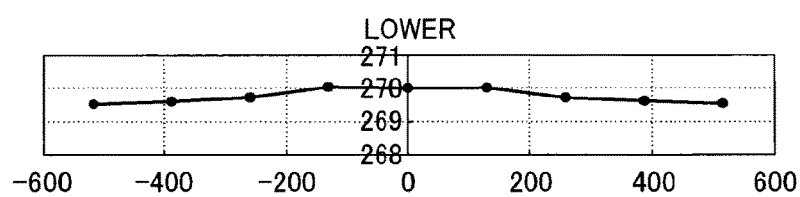
FIG. 22C is a diagram illustrating distortion in the lower end of the image exemplified in FIG. 21.

FIG. 21 illustrates an example of an image representing positions of spots having a wavelength of 550 nm displayed on the screen in the projection optical system 100a in a close range projection period. FIG. 22A is a diagram illustrating distortion in the upper side of the image exemplified in FIG. 21. FIG. 22B is a diagram illustrating distortion in the left end of the image exemplified in FIG. 21. FIG. 22C is a diagram illustrating distortion in the lower end of the image exemplified in FIG. 21.

Hereinbefore, as illustrated in FIGS. 17 to 22C, according to the projection optical system 100a of Example 2, it is possible to project an image having small distortion with respect to each zoom position and each projection distance.

Next, suppression of a change in an image during zooming at each angle of view by using spot diagrams in the projection optical system 100a according to this example will be described. The spots in each of spot diagrams illustrated in FIGS. 23 to 25 correspond to field positions indicated by F1 to F13 illustrated in FIG. 48. Each spot diagram illustrates image formation characteristics (mm) on the screen plane with respect to wavelengths of 625 nm (red), 550 nm (green), and 425 nm (blue).

Figure 23:
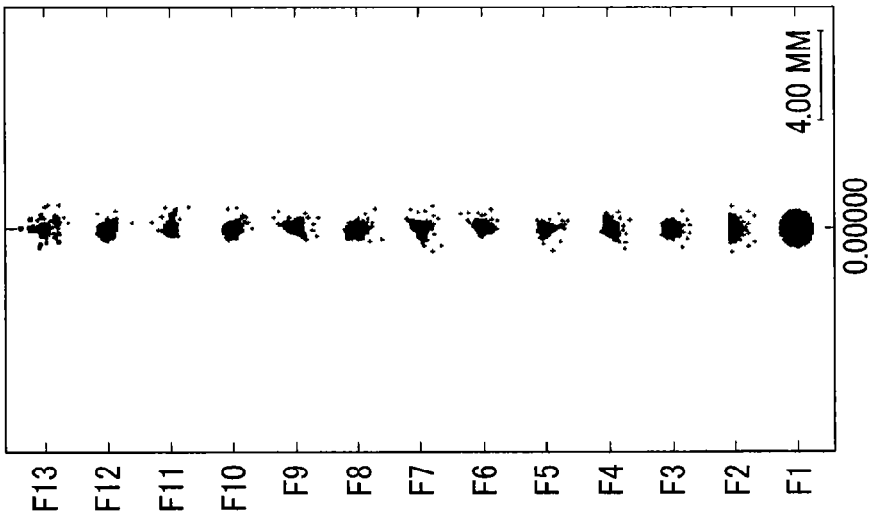
FIG. 23 is a spot diagram in the long distance projection period of the projection optical system of FIG. 15.
Figure 24:
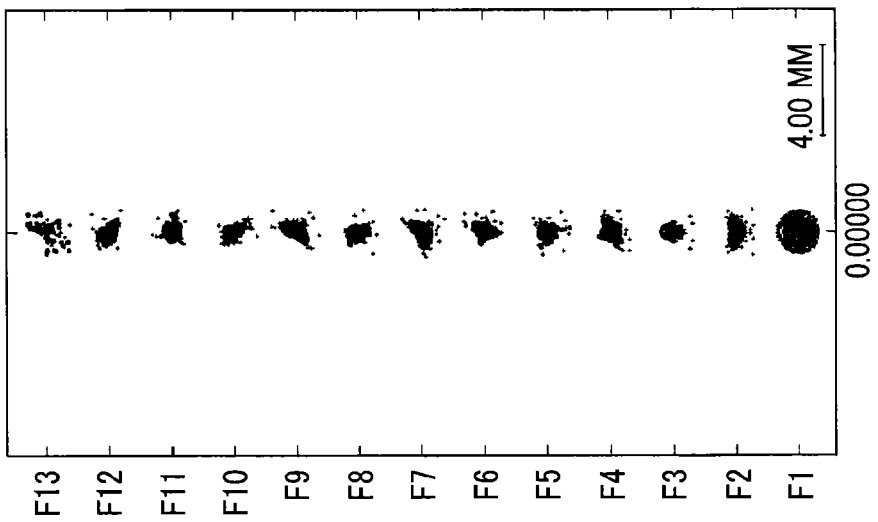
FIG. 24 is a spot diagram in the reference distance projection period of the projection optical system of FIG. 15.
Figure 25:
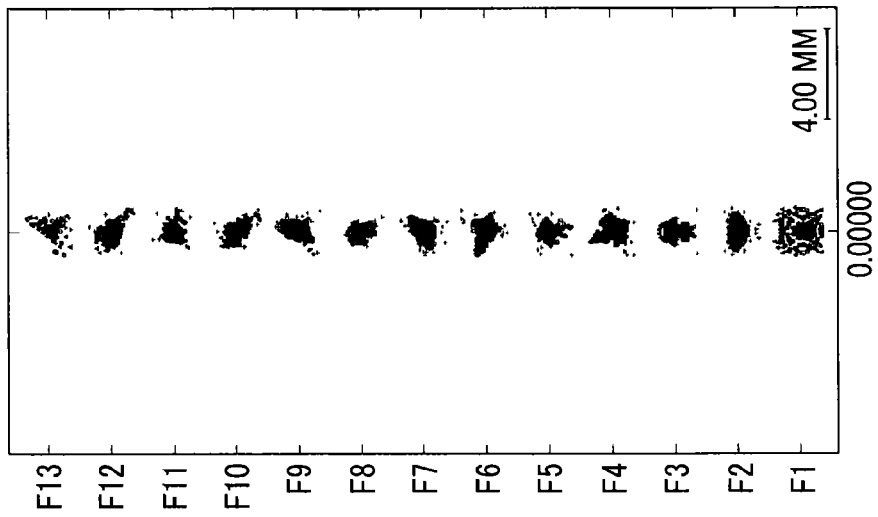
FIG. 25 is a spot diagram in the close range projection period of the projection optical system of FIG. 15.

FIG. 23 is a spot diagram in the long distance projection period. FIG. 24 is a spot diagram in the reference distance projection period. FIG. 25 is a spot diagram in the close range projection period.

As illustrated in FIGS. 23 to 25, according to the projection optical system 100a of this example, a variation in image quality at each zoom position and each projection distance is suppressed.

Third Embodiment of Image Display Apparatus

Next, still another embodiment of the image display apparatus according to the present invention will be described. In the following description, the same components are denoted by the same reference numerals, and the detailed description thereof is not repeated.

Figure 26:
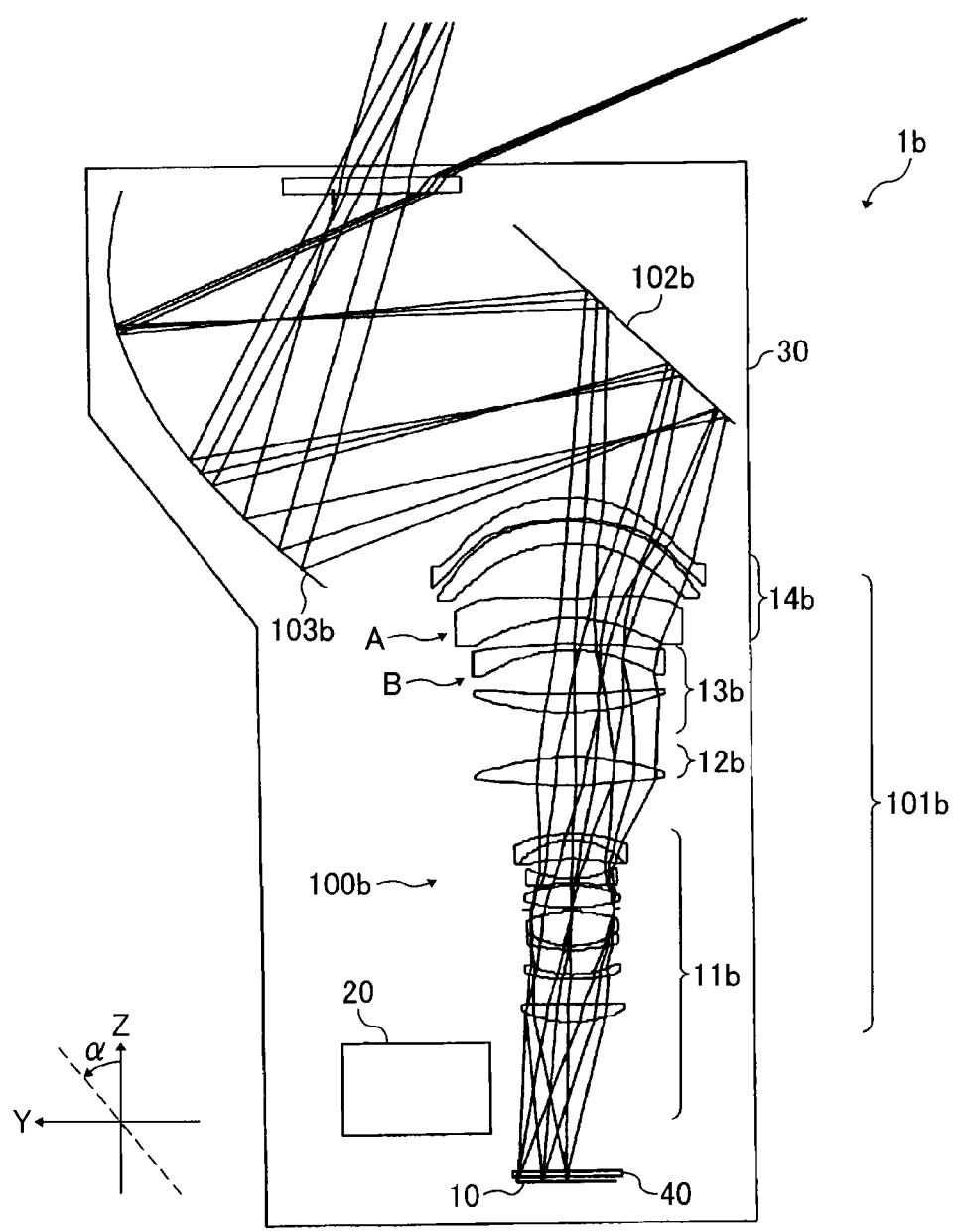
FIG. 26 is an optical layout diagram illustrating an image display apparatus according to still another embodiment of the present invention.

FIG. 26 is an optical layout diagram illustrating a projector 1b according to an embodiment of the present invention. In FIG. 26, the projector 1b includes the image forming unit 10, the parallel plate 40, a projection optical system 100b, th illumination optical system 20 including a light source which illuminates the image forming unit 10 with illumination light, and other members used for image formation, which may be accommodated in the housing 30.

The projection optical system 100b includes a refraction optical system 101b, a plane mirror 102b which is a first reflecting surface, and a curved mirror 103b which is a second reflecting surface. As illustrated in FIG. 26, the plane mirror 102b is arranged such that the normal line of the plane mirror 102b is rotated by 45 degrees from the Z axis towards the Y axis direction on the YZ plane. The curved mirror 103b may be a concave mirror or a free-form curved surface mirror of which reflecting surface has a shape of a free-form curved surface.

As described above in the case of First Embodiment, the image formed on the image forming unit 10 is magnified and projected on a screen (not illustrated).

The screen (not illustrated) is arranged to be perpendicular to the image forming unit 10. In other words, the normal line of an image formation plane of the image forming unit 10 is perpendicular to the normal line of the screen as a projection plane.

An intermediate image which is conjugate with the image information formed in the image forming unit 10 is formed by the light beam passing through the refraction optical system 101b. The intermediate image is formed as a spatial image in the side closer to the image forming unit 10 than the plane mirror 102b. The intermediate image is not necessarily formed as a plane image, but the intermediate image may be formed as a curved image.

The image is displayed on the screen by magnifying and projecting the intermediate image by using the curved mirror 103b which is arranged to be closest to the magnification side in the projection optical system 100b. Although the intermediate image has a curvature of field or distortion, the reflecting surface of the curved mirror 103b is configured to have a shape of a free-form curved surface, so that it is possible to correct the curvature of field and the distortion. Accordingly, since a burden of aberration correction on the refraction optical system 101b is reduced, a degree of freedom in the design of the projection optical system 100b is increased, so that it is advantageous to miniaturization.

The refraction optical system 101b is configured so that the first lens unit 11b which is a lens unit having a positive refractive power, the plane mirror 102b, and the curved mirror 103b are fixed with respect to the image forming unit 10 during focusing from a long distance side to a close range side. The second lens unit 12b which is a lens unit having a positive refractive power and the third lens unit 13b which is a lens unit having a negative refractive power are moved to the image forming unit 10 side. The fourth lens unit 14b which is a lens unit having a positive refractive power is moved to the magnification side. In other words, the projection optical system 100 can control a curvature of field or distortion aberration at a high accuracy by performing floating focusing.

Further, since the refraction optical system 101b is configured so that an aspherical lens is arranged in the lens unit which is moved during focusing, it is possible to improve the effect of the correction.

The projector 1b illustrated in FIG. 26 is an image display apparatus according to Example 3 described below. FIG. 26 is also an optical path diagram illustrating a case of 48-inch projector where the front lens elements provided to the projection optical system 100b are drawn out to the extreme degree. As clarified from FIG. 26, a sufficient interval between each lens and each light beam is maintained, so that interference between each light beam and each lens or a lens barrel (not illustrated) can be avoided in this state.

EXAMPLE 3

Figure 27:
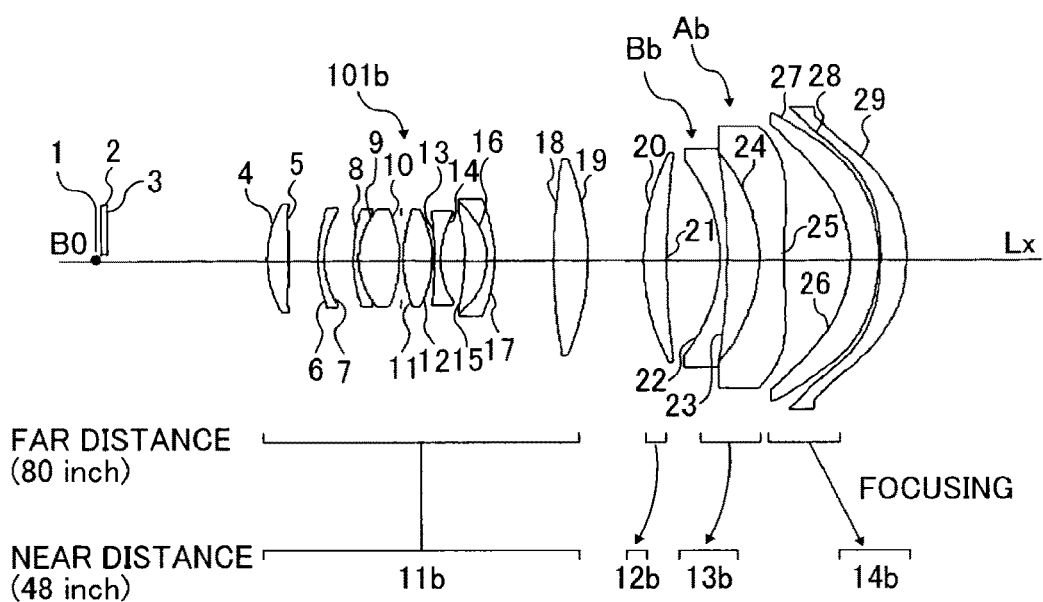
FIG. 27 is an optical layout diagram illustrating a moving locus of each of lens units constituting the projection optical system of FIG. 26 during focusing.

FIG. 27 is an optical layout diagram illustrating a refraction optical system 101b included in the projection optical system 100b according to this example. As illustrated in FIG. 27, the refraction optical system 101b includes, in order from the image forming unit 10 side, a first lens unit 11b, a second lens unit 12b, a third lens unit 13b, and a fourth lens unit 14b.

In FIG. 27, each solid line represents a moving locus of each of the lens units constituting the refraction optical system 101b during focusing from a long distance side (far distance) to a close range side (near distance). In addition, the long distance side is defined by the case where an image size projected on a screen is 80 inches; and the close range side is defined by the case where the image size is 48 inches.

The first lens unit 11b is configured to include, in order from the image forming unit 10 side, a both-side aspherical biconvex lens having a stronger convex surface toward the image forming unit 10 side, a negative meniscus lens having a convex surface toward the image forming unit 10 side, a cemented lens of a negative meniscus lens having a convex surface toward the image forming unit 10 side and a biconvex lens having a stronger convex surface toward the image forming unit 10 side, an aperture stop (not illustrated), a both-side aspherical convex lens having a stronger convex surface toward the magnification side, a biconcave lens having a stronger concave surface at the magnification side, a cemented lens of a positive meniscus lens having a convex surface toward the magnification side and a negative meniscus lens having a convex surface toward the magnification side, and a biconvex lens having a stronger convex surface toward the magnification side.

The second lens unit 12b is configured with a positive meniscus lens having a convex surface toward the image forming unit 10 side.

The third lens unit 13b is configured to include a negative meniscus lens Bb having a convex surface toward the magnification side and a both-side aspherical biconcave lens Ab having a stronger concave surface toward the image forming unit 10 side and having a shape that has a negative power on the optical axis Lx and a positive power in the periphery.

The fourth lens unit 14b is configured to include a both-side aspherical negative meniscus lens having a convex surface toward the magnification side and having a shape that has a negative power on the optical axis Lx and a positive power in the periphery and a both-side aspherical positive meniscus lens having a convex surface toward the magnification side and having a shape that has a positive power on the optical axis Lx and a negative power in the periphery.

Table 13 (Tables 13A and 13B) of FIGS. 62A and 62B lists data representing examples of optical elements included in the projection optical system 100b according to Example 3. In the table, S denotes each lens surface of the refraction optical system 101b as indicated by the numeral in FIG. 27. Further, a light beam distance denotes a distance between a lower light beam at the maximum angle of view in the Y axis direction on each surface and the optical axis Lx.

Table 14 illustrated in FIG. 63 represents a specific example of lens intervals during focusing in the projection optical system 100b according to this example.

Table 15 illustrated in FIG. 64 represents a specific example of numerical values of aspherical coefficients in the projection optical system 100b according to this example. The aspherical surface is expressed by the above-described Mathematical Formula 1 (Equation 1) of FIG. 49.

Table 16 illustrated in FIG. 65 represents a specific example of numerical values of free-form curved surface coefficients in the projection optical system 100b according to this example. The free-form curved surface is expressed by the above-described Mathematical Formula 2 (Equation 2) illustrated in FIG. 49.

Table 17 represents a specific example of a DMD used as the image forming unit 10 in the projection optical system 100b according to this example.

Table 18 represents a specific example of position coordinates and angles of a rotation of the plane mirror 102b and the curved mirror 103b from the vertex of the lens located to be closest to the plane mirror 102b side among the lenses included in the refraction optical system 101b in the focus state where the projected image has a maximum size. The rotation represents the angle between the normal line of the surface and the optical axis Lx.

Next, suppression of a deterioration in image quality at each zoom position and each projection distance in the projection optical system 100b according to this example will be described with reference to FIGS. 28 to 33C. FIGS. 28 to 33C are diagrams illustrating positions of main light beams having a wavelength of 550 nm and diagrams illustrating distortion of an image at each angle of view when the image representing the positions of the main light beams is displayed on the screen with respect to each zoom position and each projection distance in the projection optical system 100b according to Example 3.

Figure 28:
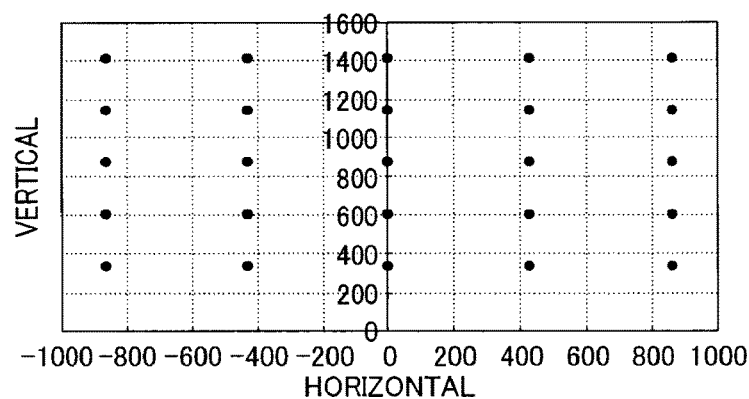
FIG. 28 is a diagram illustrating an example of an image on a screen in a long distance projection period of the projection optical system of FIG. 26.
Figure 29A:
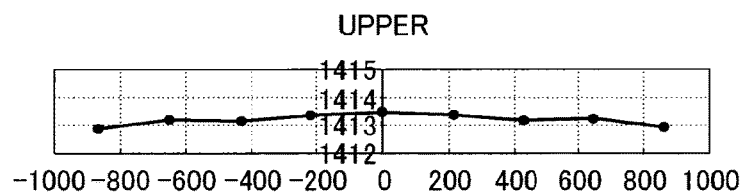
FIG. 29A is a diagram illustrating distortion in the upper side of the image exemplified in FIG. 28.
Figure 29B:
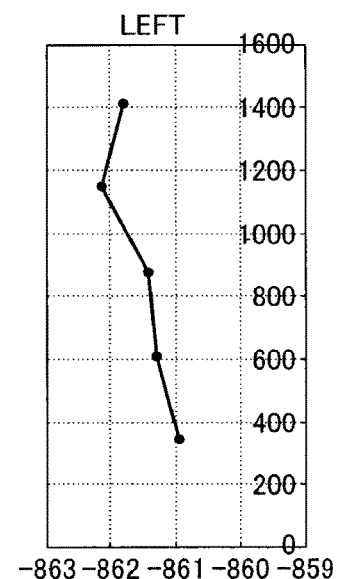
FIG. 29B is a diagram illustrating distortion in the left end of the image exemplified in FIG. 28.
Figure 29C:
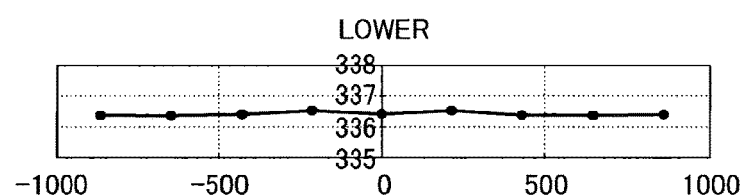
FIG. 29C is a diagram illustrating distortion in the lower end of the image exemplified in FIG. 28.

FIG. 28 illustrates an example of an image representing positions of spots having a wavelength of 550 nm displayed on the screen in the projection optical system 100b in a long distance projection period. FIG. 29A is a diagram illustrating distortion in the upper side of the image exemplified in FIG. 28. FIG. 29B is a diagram illustrating distortion in the left end of the image exemplified in FIG. 28. FIG. 29C is a diagram illustrating distortion in the lower end of the image exemplified in FIG. 28.

Figure 30:
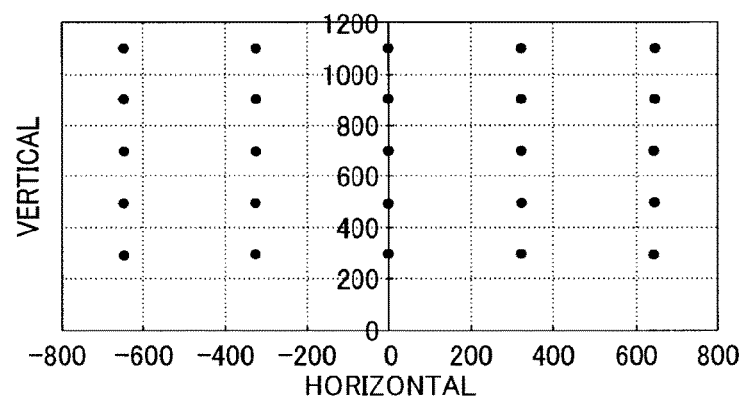
FIG. 30 is a diagram illustrating an example of an image on a screen in a reference distance projection period of the projection optical system of FIG. 26.
Figure 31A:
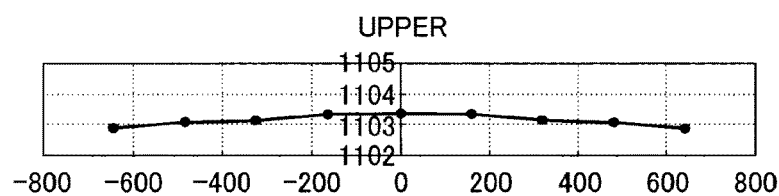
FIG. 31A is a diagram illustrating distortion in the upper side of the image exemplified in FIG. 30.
Figure 31B:
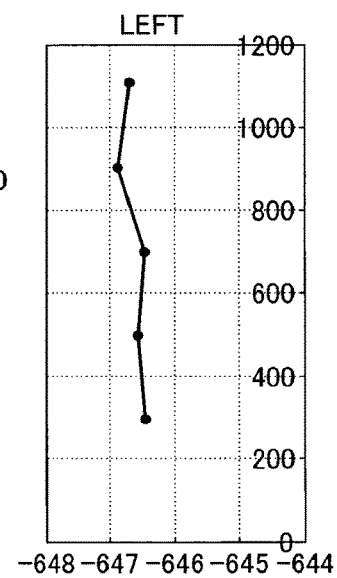
FIG. 31B is a diagram illustrating distortion in the left end of the image exemplified in FIG. 30.
Figure 31C:
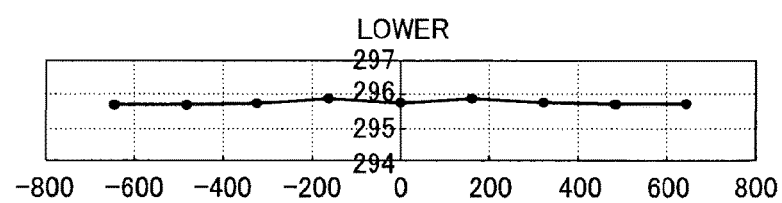
FIG. 31C is a diagram illustrating distortion in the lower end of the image exemplified in FIG. 30.

FIG. 30 illustrates an example of an image representing positions of spots having a wavelength of 550 nm displayed on the screen in the projection optical system 100b in a reference distance projection period. FIG. 31A is a diagram illustrating distortion in the upper side of the image exemplified in FIG. 30. FIG. 31B is a diagram illustrating distortion in the left end of the image exemplified in FIG. 30. FIG. 31C is a diagram illustrating distortion in the lower end of the image exemplified in FIG. 30.

Figure 32:
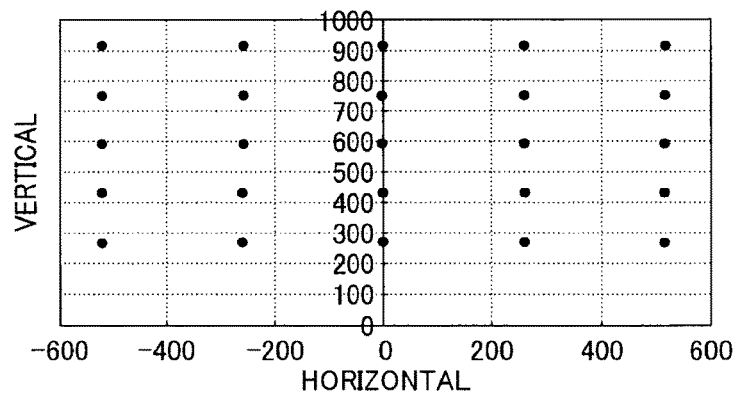
FIG. 32 is a diagram illustrating an example of an image on a screen in a close range projection period of the projection optical system of FIG. 26.
Figure 33A:
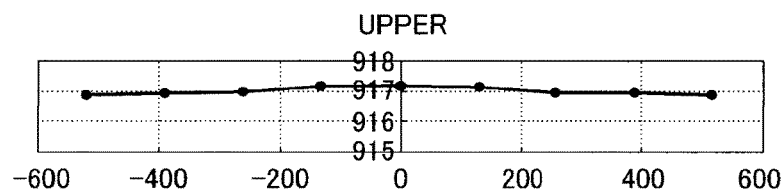
FIG. 33A is a diagram illustrating distortion in the upper side of the image exemplified in FIG. 32.
Figure 33B:
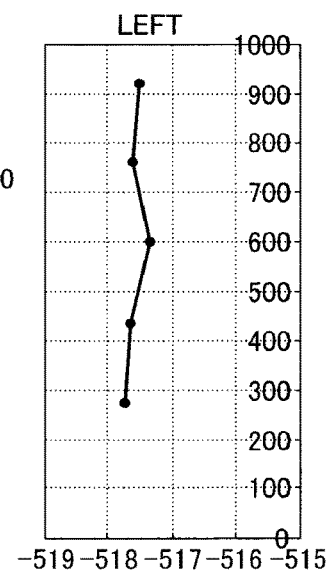
FIG. 33B is a diagram illustrating distortion in the left end of the image exemplified in FIG. 32.
Figure 33C:
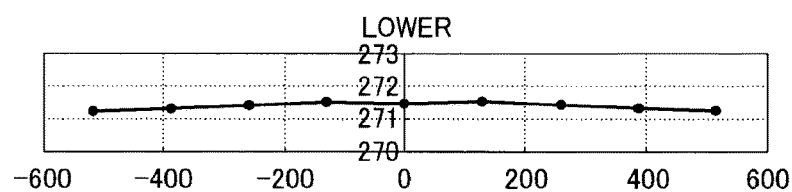
FIG. 33C is a diagram illustrating distortion in the lower end of the image exemplified in FIG. 32.

FIG. 32 illustrates an example of an image representing positions of spots having a wavelength of 550 nm displayed on the screen in the projection optical system 100b in a close range projection period. FIG. 33A is a diagram illustrating distortion in the upper side of the image exemplified in FIG. 32. FIG. 33B is a diagram illustrating distortion in the left end of the image exemplified in FIG. 32. FIG. 33C is a diagram illustrating distortion in the lower end of the image exemplified in FIG. 32.

Hereinbefore, as illustrated in FIGS. 28 to 33C, according to the projection optical system 100b of this example, it is possible to project an image having small distortion with respect to each zoom position and each projection distance.

Next, suppression of a change in an image during zooming at each angle of view by using spot diagrams in the projection optical system 100b according to this example will be described. The spots in each of spot diagrams illustrated in FIGS. 34 to 36 correspond to field positions indicated by F1 to F13 illustrated in FIG. 48. Each spot diagram illustrates image formation characteristics (mm) on the screen plane with respect to wavelengths of 625 nm (red), 550 nm (green), and 425 nm (blue).

Figure 34:
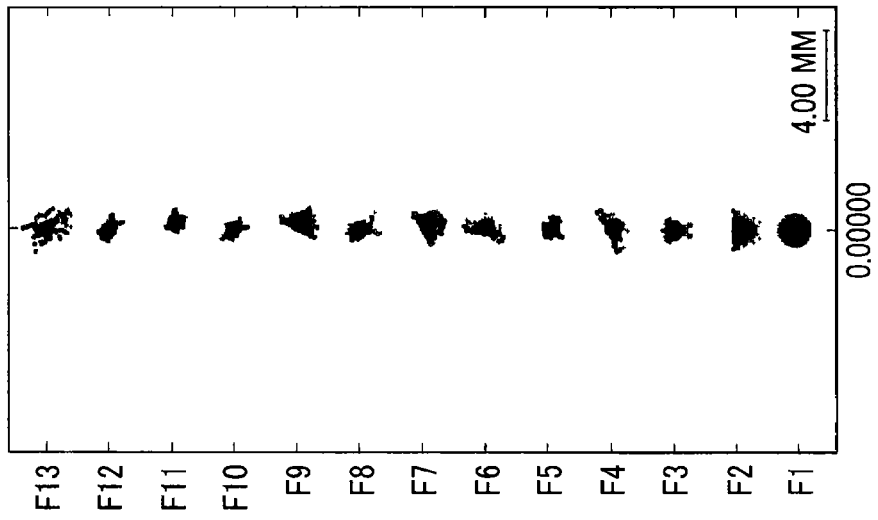
FIG. 34 is a spot diagram in the long distance projection period of the projection optical system of FIG. 26.
Figure 35:
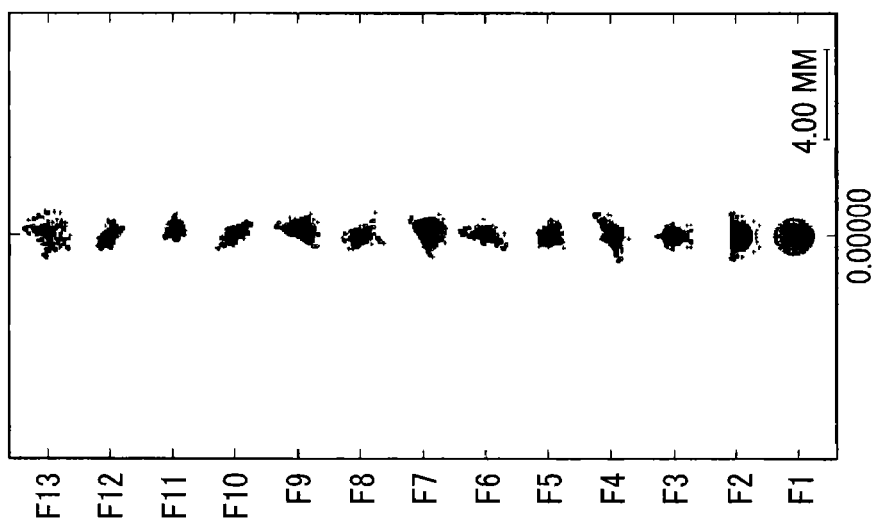
FIG. 35 is a spot diagram in the reference distance projection period of the projection optical system of FIG. 26.
Figure 36:
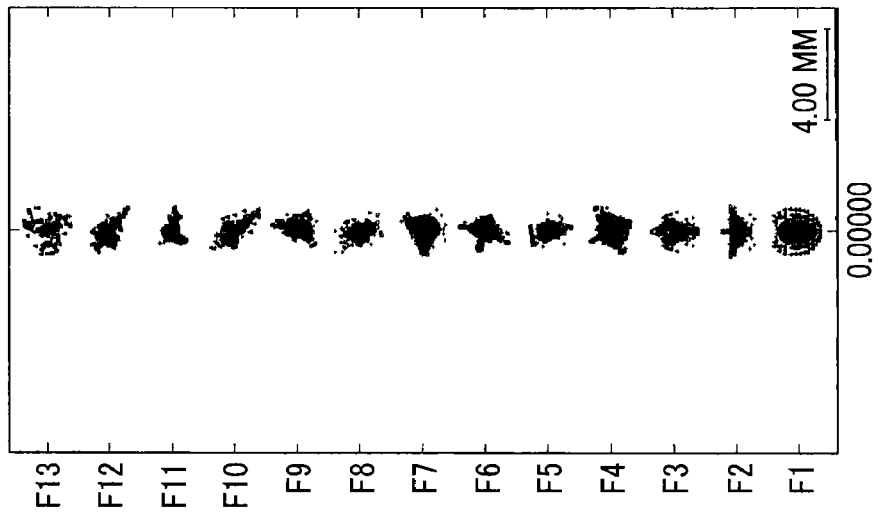
FIG. 36 is a spot diagram in the close range projection period of the projection optical system of FIG. 26.

FIG. 34 is a spot diagram in the long distance projection period. FIG. 35 is a spot diagram in the reference distance projection period. FIG. 36 is a spot diagram in the close range projection period.

As illustrated in FIGS. 34 to 36, according to the projection optical system 100b of this example, a variation in image quality at each zoom position and each projection distance is suppressed.

Fourth Embodiment of Image Display Apparatus

Next, further still another embodiment of the image display apparatus according to the present invention will be described. In the following description, the same components are denoted by the same reference numerals, and the detailed description thereof is not repeated.

Figure 37:
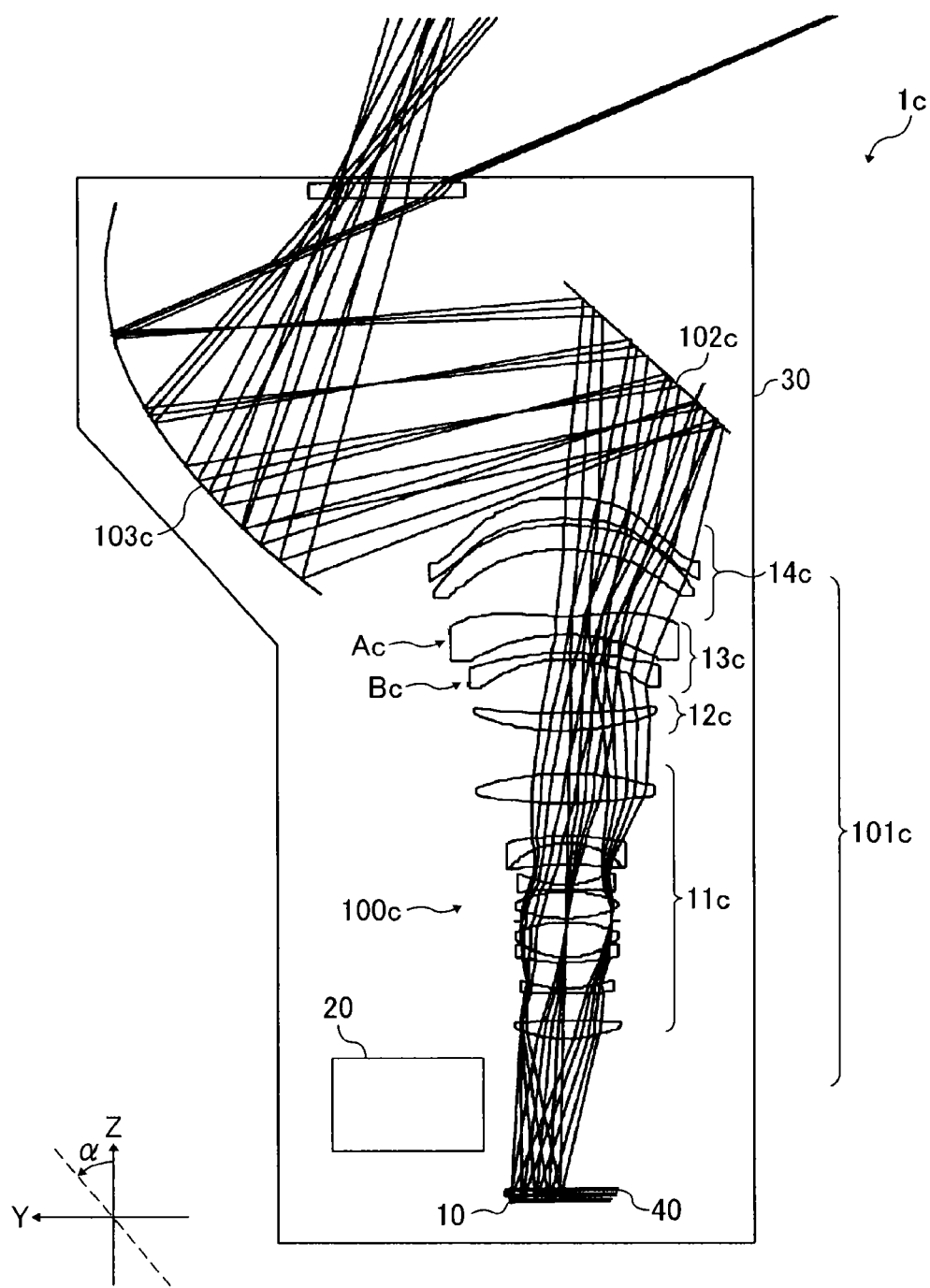
FIG. 37 is an optical layout diagram illustrating an image display apparatus according to further still another embodiment of the present invention.

FIG. 37 is an optical layout diagram illustrating a projector 1c according to an embodiment of the present invention. In FIG. 37, the projector 1c includes the image forming unit 10, the parallel plate 40, a projection optical system 100c, the illumination optical system 20 including a light source which illuminates the image forming unit 10 with illumination light, and other members used for image formation, which may be accommodated in the housing 30.

The projection optical system 100c is configured to include a refraction optical system 101c, a plane mirror 102c which is a first reflecting surface, and a curved mirror 103c which is a second reflecting surface. As illustrated in FIG. 37, the plane mirror 102c is arranged such that the normal line of the plane mirror 102c is being rotated by 45 degrees from the Z axis towards the Y axis direction on the YZ plane. The curved mirror 103c may be a concave mirror or a free-form curved surface mirror of which reflecting surface has a shape of a free-form curved surface.

As described above in the case of Example 1, the image formed on the image forming unit 10 is magnified and projected on a screen (not illustrated).

The screen (not illustrated) is arranged to be perpendicular to the image forming unit 10. In other words, the normal line of an image formation plane of the image forming unit 10 is perpendicular to the normal line of the screen as a projection plane.

An intermediate image which is conjugate with the image information formed in the image forming unit 10 is formed by the light beam passing through the refraction optical system 101c. The intermediate image is formed as a spatial image in the side closer to the image forming unit 10 than the plane mirror 102c. In addition, the intermediate image is not necessarily formed as a plane image, but the intermediate image may be formed as a curved image.

The image is displayed on the screen by magnifying and projecting the intermediate image by using the curved mirror 103c which is arranged to be closest to the magnification side in the projection optical system 100c. Although the intermediate image has a curvature of field or distortion, the reflecting surface of the curved mirror 103c is configured to have a shape of a free-form curved surface, so that it is possible to correct the curvature of field and the distortion. Accordingly, since a burden of aberration correction on the refraction optical system 101c is reduced, a degree of freedom in the design of the projection optical system 100c is increased, so that it is advantageous to miniaturization.

The refraction optical system 101c is configured so that the first lens unit 11c which is a lens unit having a positive refractive power, the plane mirror 102c, and the curved mirror 103c are fixed with respect to the image forming unit 10 during focusing from a long distance side to a close range side. The second lens unit 12c which is a lens unit having a positive refractive power and the third lens unit 13c which is a lens unit having a negative refractive power are moved to the image forming unit 10 side. The fourth lens unit 14c which is a lens unit having a positive refractive power is moved to the magnification side. In other words, the projection optical system 100c can control a curvature of field or distortion aberration at a high accuracy by performing floating focusing.

In addition, since the refraction optical system 101c is configured so that an aspherical lens is arranged in the lens unit which is moved during focusing, it is possible to improve the effect of the correction.

The projector 1c illustrated in FIG. 37 is an image display apparatus according to Example 4 described below. FIG. 37 is also an optical path diagram illustrating a case of 48-inch projector where the front lens elements provided to the projection optical system 100c are drawn out to the extreme degree. As clarified from FIG. 37, a sufficient interval between each lens and each light beam is maintained, so that interference between each light beam and each lens or a lens barrel (not illustrated) can be avoided in this state.

EXAMPLE 4

Figure 38:
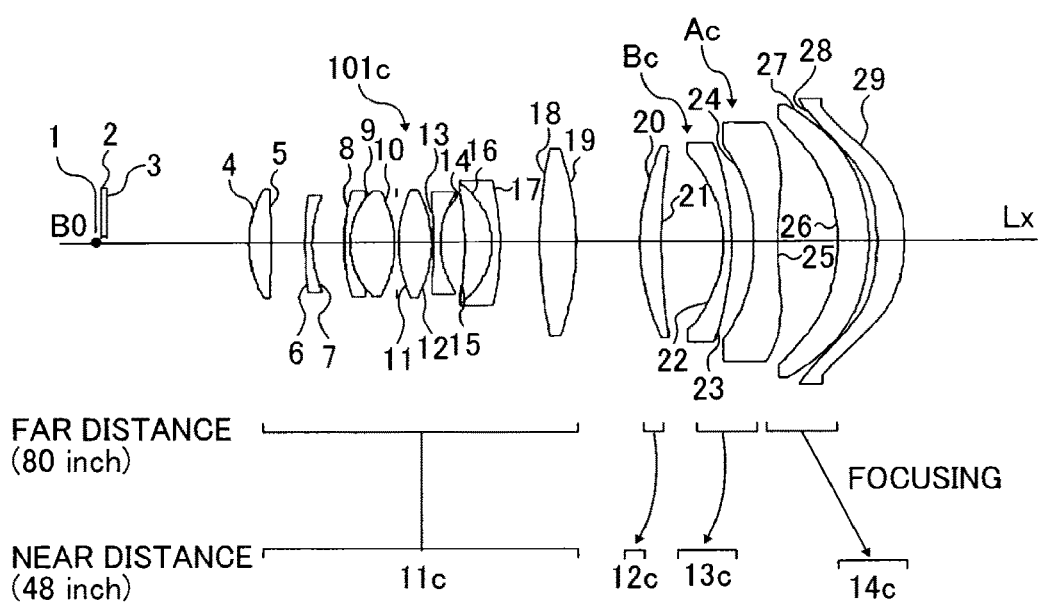
FIG. 38 is an optical layout diagram illustrating a moving locus of each of lens units constituting the projection optical system of FIG. 37 during focusing.

FIG. 38 is an optical layout diagram illustrating a refraction optical system 101c included in the projection optical system 100c according to this embodiment. As illustrated in FIG. 38, the refraction optical system 101c is configured to include, in order from the image forming unit 10 side, a first lens unit 11c, a second lens unit 12c, a third lens unit 13c, and a fourth lens unit 14c.

In FIG. 38, each solid line represents a moving locus of each of the lens units constituting the refraction optical system 101c during focusing from a long distance side (far distance) to a close range side (near distance). In addition, the long distance side is defined by the case where an image size projected on a screen is 80 inches; and the close range side is defined by the case where the image size is 48 inches.

The first lens unit 11c is configured to include, in order from the image forming unit 10 side, a both-side aspherical biconvex lens having a stronger convex surface toward the image forming unit 10 side, a negative meniscus lens having a stronger convex surface toward the image forming unit 10 side, a cemented lens of a negative meniscus lens having a convex surface toward the image forming unit 10 side and a biconvex lens having a stronger convex surface toward the magnification side, an aperture stop (not illustrated), a both-side aspherical convex lens having a stronger convex surface toward the magnification side, a both-side aspherical biconvex lens having a stronger convex surface at the magnification side, a biconcave lens having a stronger concave surface at the magnification side, a cemented lens of a positive meniscus lens having a convex surface toward the magnification side and a negative meniscus lens having a convex surface toward the magnification side, and a biconvex lens having a stronger convex surface toward the magnification side.

The second lens unit 12c is configured with a positive meniscus lens having a convex surface toward the image forming unit 10 side.

The third lens unit 13c is configured to include a negative meniscus lens Bc having a convex surface toward the magnification side and a both-side aspherical biconcave lens Ac having a stronger concave surface toward the image forming unit 10 side and having a shape that has a negative power on the optical axis Lx and a positive power in the periphery.

The fourth lens unit 14c is configured to include a both-side aspherical negative meniscus lens having a convex surface toward the magnification side and having a shape that has a negative power on the optical axis Lx and a positive power in the periphery and a both-side aspherical positive meniscus lens having a convex surface toward the magnification side and having a shape that has a positive power on the optical axis Lx and a negative power in the periphery.

Table 19 (Tables 19A and 19B) illustrated in FIGS. 68A and 68B lists data representing examples of optical elements included in the projection optical system 100c according to this example. In the table, S denotes each lens surface of the refraction optical system 101c as indicated by the numeral in FIG. 38. Further, a light beam distance, or an optical length, denotes a distance between a lower light beam at the maximum angle of view in the Y axis direction on each surface and the optical axis Lx.

Table 20 illustrated in FIG. 69 represents a specific example of lens intervals during focusing in the projection optical system 100c according to this example.

Table 21 illustrated in FIG. 70 represents a specific example of numerical values of aspherical coefficients in the projection optical system 100c according to this example. The aspherical surface is expressed by the above-described Mathematical Formula 1 (Equation 1) illustrated in FIG. 49.

Table 22 illustrated in FIG. 71 represents a specific example of numerical values of free-form curved surface coefficients in the projection optical system 100c according to this example. The free-form curved surface is expressed by the above-described Mathematical Formula 2 (Equation 2) illustrated in FIG. 49.

Table 23 illustrated in FIG. 72 represents a specific example of a DMD used as the image forming unit 10 in the projection optical system 100c according to this example.

Table 24 illustrated in FIG. 73 represents a specific example of position coordinates and angles of α rotation of the plane mirror 102c and the curved mirror 103c from the vertex of the lens located to be closest to the plane mirror 102c side among the lenses included in the refraction optical system 101c in the focus state where the projected image has a maximum size. The rotation represents the angle between the normal line of the surface and the optical axis Lx.

Next, suppression of a deterioration in image quality at each zoom position and each projection distance in the projection optical system 100c according to this example will be described with reference to FIGS. 39 to 44C. FIGS. 39 to 44C are diagrams illustrating positions of main light beams having a wavelength of 550 nm and diagrams illustrating distortion of an image at each angle of view when the image representing the positions of the main light beams is displayed on the screen with respect to each zoom position and each projection distance in the projection optical system 100c according to Example 4.

Figure 39:
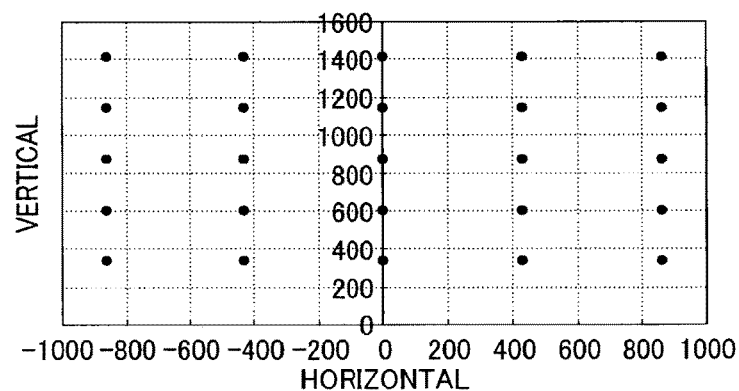
FIG. 39 is a diagram illustrating an example of an image on a screen in a long distance projection period of the projection optical system of FIG. 37.
Figure 40A:
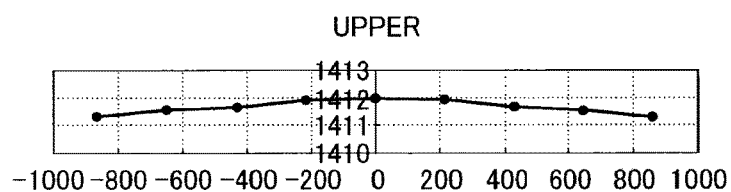
FIG. 40A is a diagram illustrating distortion in the upper side of the image exemplified in FIG. 39.
Figure 40B:
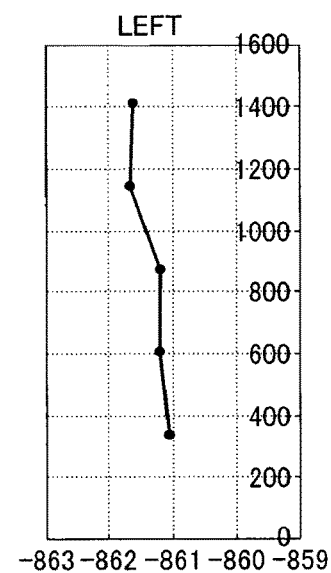
FIG. 40B is a diagram illustrating distortion in the left end of the image exemplified in FIG. 39.
Figure 40C:
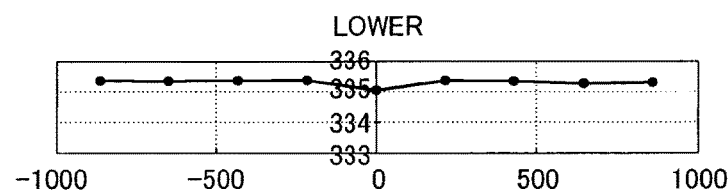
FIG. 40C is a diagram illustrating distortion in the lower end of the image exemplified in FIG. 39.

FIG. 39 illustrates an example of an image representing positions of spots having a wavelength of 550 nm displayed on the screen in the projection optical system 100c in a long distance projection period. FIG. 40A is a diagram illustrating distortion in the upper side of the image exemplified in FIG. 39. FIG. 40B is a diagram illustrating distortion in the left end of the image exemplified in FIG. 39. FIG. 40C is a diagram illustrating distortion in the lower end of the image exemplified in FIG. 39.

Figure 41:
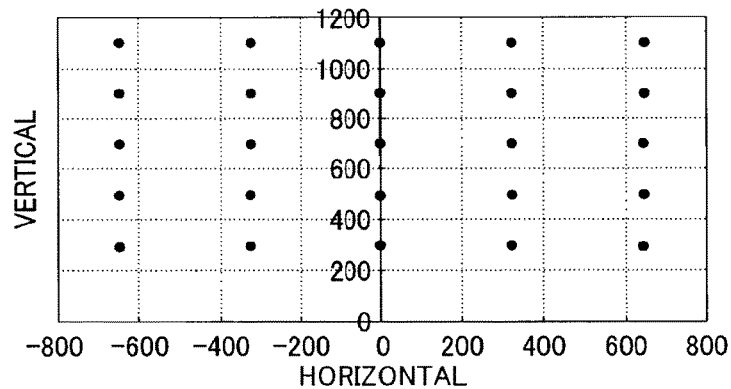
FIG. 41 is a diagram illustrating an example of an image on a screen in a reference distance projection period of the projection optical system of FIG. 37.
Figure 42A:
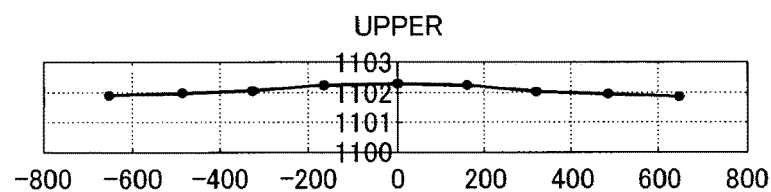
FIG. 42A is a diagram illustrating distortion in the upper side of the image exemplified in FIG. 41.
Figure 42B:
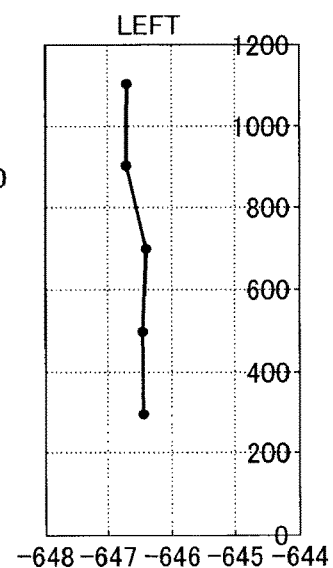
FIG. 42B is a diagram illustrating distortion in the left end of the image exemplified in FIG. 41.
Figure 42C:
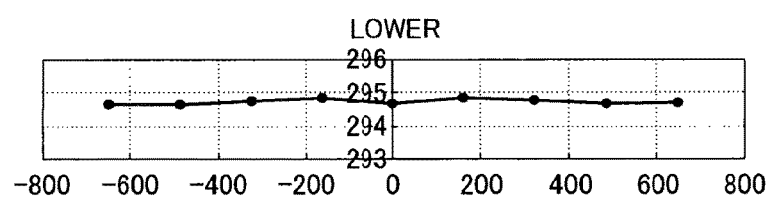
FIG. 42C is a diagram illustrating distortion in the lower end of the image exemplified in FIG. 41.

FIG. 41 illustrates an example of an image representing positions of spots having a wavelength of 550 nm displayed on the screen in the projection optical system 100c in a reference distance projection period. FIG. 42A is a diagram illustrating distortion in the upper side of the image exemplified in FIG. 41. FIG. 42B is a diagram illustrating distortion in the left end of the image exemplified in FIG. 41. FIG. 42C is a diagram illustrating distortion in the lower end of the image exemplified in FIG. 41.

Figure 43:
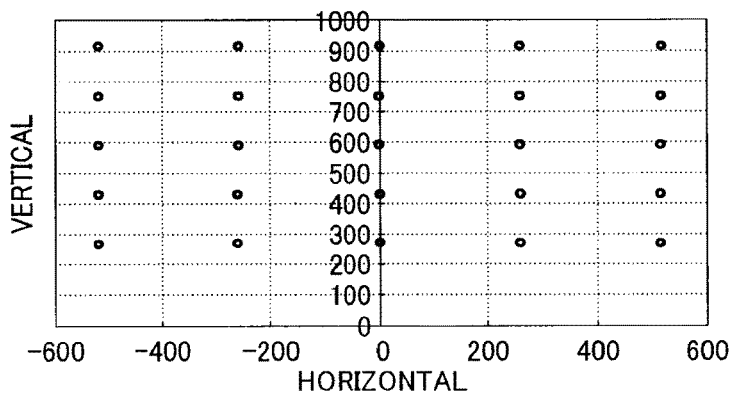
FIG. 43 is a diagram illustrating an example of an image on a screen in a close range projection period of the projection optical system of FIG. 37.
Figure 44A:
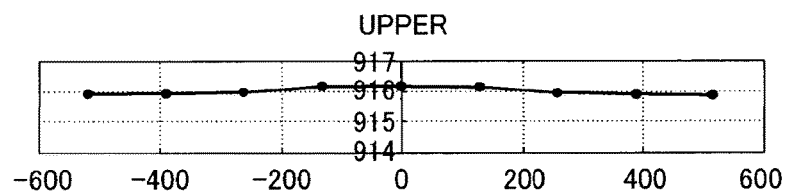
FIG. 44A is a diagram illustrating distortion in the upper side of the image exemplified in FIG. 43.
Figure 44B:
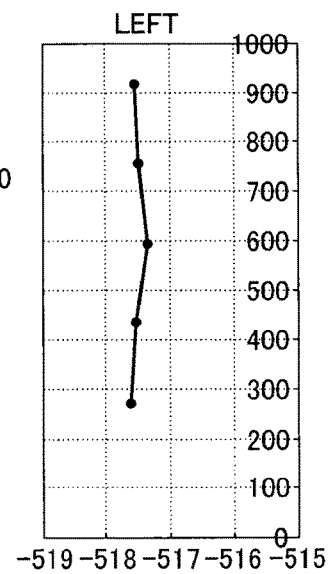
FIG. 44B is a diagram illustrating distortion in the left end of the image exemplified in FIG. 43.
Figure 44C:
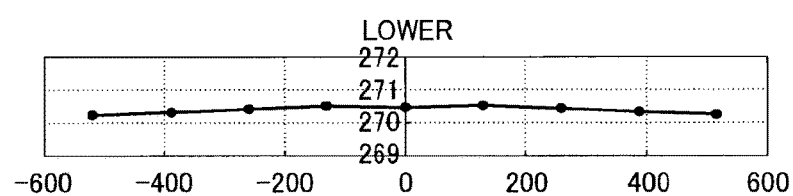
FIG. 44C is a diagram illustrating distortion in the lower end of the image exemplified in FIG. 43.

FIG. 43 illustrates an example of an image representing positions of spots having a wavelength of 550 nm displayed on the screen in the projection optical system 100c in a close range projection period. FIG. 44A is a diagram illustrating distortion in the upper side of the image exemplified in FIG. 43. FIG. 44B is a diagram illustrating distortion in the left end of the image exemplified in FIG. 43. FIG. 44C is a diagram illustrating distortion in the lower end of the image exemplified in FIG. 43.

Hereinbefore, as illustrated in FIGS. 39 to 44C, according to the projection optical system 100c of this example, it is possible to project an image having small distortion with respect to each zoom position and each projection distance.

Next, suppression of a change in an image during zooming at each angle of view by using spot diagrams in the projection optical system 100c according to the example will be described. The spots in each of spot diagrams illustrated in FIGS. 45 to 47 correspond to field positions indicated by F1 to F13 illustrated in FIG. 48. Each spot diagram illustrates image formation characteristics (mm) on the screen plane with respect to wavelengths of 625 nm (red), 550 nm (green), and 425 nm (blue).

Figure 45:
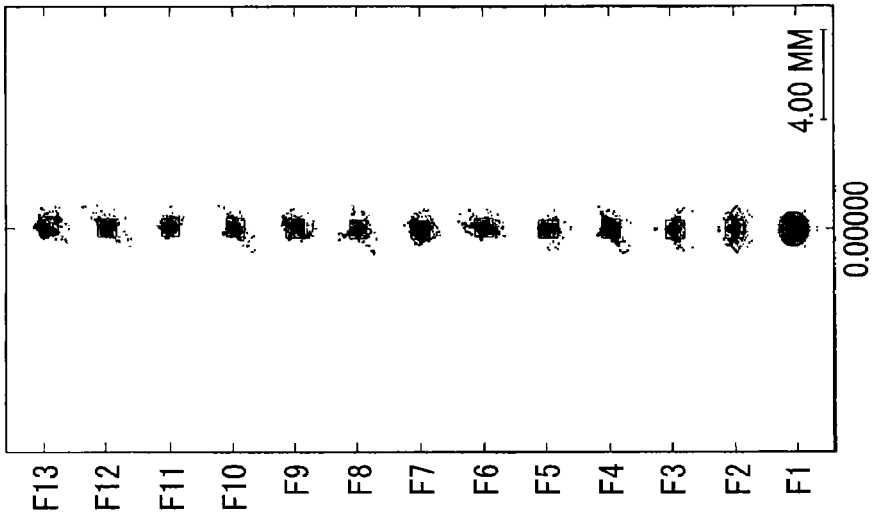
FIG. 45 is a spot diagram in the long distance projection period of the projection optical system of FIG. 37.
Figure 46:
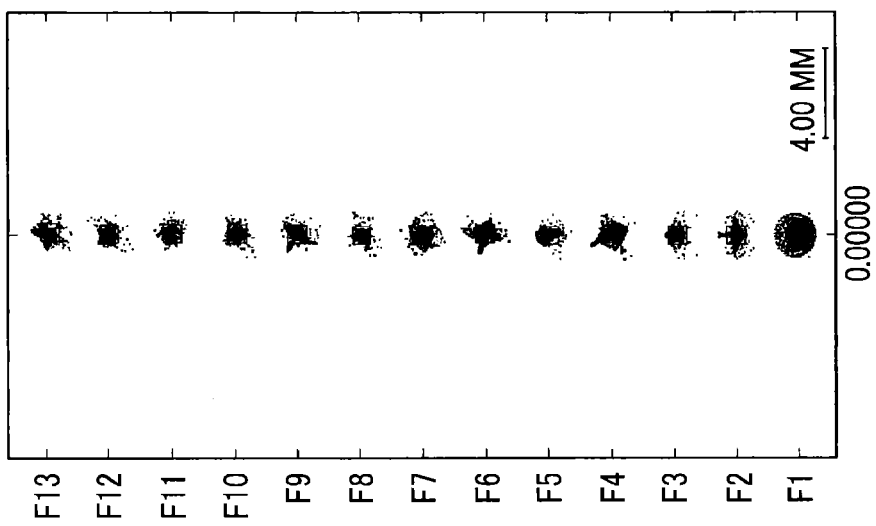
FIG. 46 is a spot diagram in the reference distance projection period of the projection optical system of FIG. 37.
Figure 47:
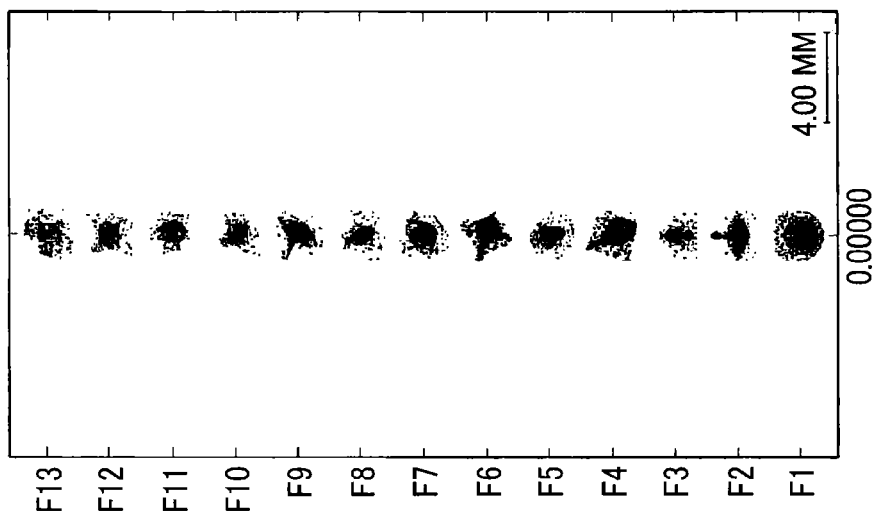
FIG. 47 is a spot diagram in the close range projection period of the projection optical system of FIG. 37.

FIG. 45 is a spot diagram in the long distance projection period. FIG. 46 is a spot diagram in the reference distance projection period. FIG. 47 is a spot diagram in the close range projection period.

As illustrated in FIGS. 45 and 46, according to the projection optical system 100c of this example, a variation in image quality at each zoom position and each projection distance is suppressed.

Now, main features of the above-described projection optical systems and image display apparatuses according to the present invention are as follows.

Feature 1

According to example embodiments of the present invention, there is provided a projection optical system including: in order from a reduction side to a magnification side, an image forming unit, a refraction optical system, and a first reflecting surface and a second reflecting surface. When an optical axis shared by the largest number of lenses among optical axes of a plurality of the lenses of the refraction optical system is defined by an optical axis of the projection optical system, when, in arrangement where a distance between an intersection of a magnification-side surface of a lens which is arranged to be closest to the magnification side of the refraction optical system and the optical axis and an intersection between the first reflecting surface and the optical axis has a minimum value, the distance between the intersections is denoted by L, when a focal length of the refraction optical system is denoted by f, when a direction parallel to the optical axis is defined by a Z axis direction, when an arrangement direction of the first reflecting surface and the second reflecting surface is defined by a Y axis direction, and when a maximum value of a distance between the optical axis and an end portion of the image forming unit in the Y axis direction is denoted by Ymax, in a YZ plane which is a plane parallel to the Y axis direction and the Z axis direction, a maximum value D1 of a distance between an intersection of a light beam from the image forming unit and the magnification-side surface of the lens which is arranged to be closest to the magnification side of the refraction optical system and the optical axis, a sag amount ds1 which is a sag amount of the magnification-side surface of the lens which is arranged to be closest to the magnification side of the refraction optical system at the D1 and of which positive direction is defined by the direction from the reduction side in the Z axis toward the magnification side, a point H of which distance from the optical axis has a maximum value among the intersections of the light beam and the first reflecting surface, a point F of which distance from the optical axis has a minimum value among the intersections of the light beam and the second reflecting surface, and an angle θ1 between a line connecting the H and the F and the optical axis satisfies the following conditions (1) and (2).

$$0 < Y\text{max}/f - 1/\tan\theta 1 \qquad \text{condition (1)}$$

$$-0.1 < (L-D1-ds1)/(L+D1+ds1) - 1/\tan\theta 1 \qquad \text{condition (2)}$$

In the projection optical system using mirrors, a method of inserting a folding mirror between the refraction optical system and the reflection surface is used in order to reduce a full-length direction size thereof. However, if conditions are not appropriate, interference occurs between the light beam and the lens or a barrel member. As a method of avoiding the interference (interference between the light beam and the member), there is a method of increasing a separation distance between the folding mirror and the refraction optical system or a method of reducing a diameter of the lens which is closest to the magnification side of the refraction optical system. However, the former method is contrary to the purpose of miniaturization in the full-length direction. In addition, in the latter method, since the role of the lens such as aberration correction, particularly, correction of a curvature of field or distortion aberration is decreased, the burden to the second reflecting surface is increased, so that the mirror size is increased. As a result, the size of the apparatus on which the projection optical system is mounted needs to be increased. In this manner, there is a problem in that, if the size in the full-length direction is tried to be reduced without any preparation, performance is easily deteriorated, and if the performance is tried to be secured, the size is increased.

With respect to the problem, according to the projection optical system satisfying the conditions (1) and (2), it is possible to provide a projection optical system having a small size, having no occurrence of interference with a light beam, and having high performance. Each of the aforementioned conditions (1) and (2) represents an appropriate range of an emission angle of the folded light beam from the first reflecting surface.

If the aforementioned value is less than the lower limit of the condition (1), interference easily occurs between the light emitted from the first reflecting surface and the lens, so that the emission angle of the light emitted from the refraction optical system is also increased. Accordingly, the size of the folding mirror becomes large, and thus, an intermediate image becomes large, so that the second reflecting surface needs to be large. As a result, the image display apparatus on which the projection optical system is mounted needs to be large.

In addition, in order to project an image at an appropriate position on the screen, a radius of curvature of the second reflecting surface needs to be small. Accordingly, in the correction of the curvature of field and the distortion aberration, it is difficult to maintain balance, so that a manufacturing error sensitivity of the second reflecting surface is increased or the performance is deteriorated.

In addition, if the aforementioned value is less than the lower limit of the condition (2), interference occurs between the lens and the light beam.

Therefore, when the conditions (1) and (2) are satisfied at the same time, although the distance between the refraction optical system and the first reflecting surface is shortened, the interference of the light beam does not occur, and the diameter of the lens which is closest to the magnification side of the refraction optical system can be increased. Accordingly, the burden to the lens, particularly, the role of the correction of the curvature of field is increased, so that the burden to the second reflecting surface can be reduced.

In addition to the decrease in the manufacturing error sensitivity and the improvement of the performance, the miniaturization of the second reflecting surface and the miniaturization of the apparatus can be particularly effectively implemented.

Feature 2

In the projection optical system according to the present invention, in addition to Feature 1, when an angle between a light beam emitted from the refraction optical system for an upper light beam at the maximum angle of view in the Y axis direction and the optical axis is denoted by θ2, when a distance between an intersection of the light beam emitted from the refraction optical system for the upper light beam at the maximum angle of view in the Y axis direction and the closest-magnification-side surface of the refraction optical system and the optical axis is denoted by D2, and when a sag amount which is a sag amount of the magnification-side surface of the lens which is arranged to be closest to the magnification side of the refraction optical system at a height of the D2 and of which positive direction is defined by the direction from the reduction side in the Z axis toward the magnification side is denoted by ds2, the angle θ2 satisfies the following conditions (3) and (4).

$$0 < Y\max/f - 1/\tan θ2. \quad \text{condition (3)}$$

$$-0.05 < (L-D2-ds2)/(L+D1-ds2) - 1/\tan θ2. \quad \text{condition (4)}$$

Each of the conditions (3) and (4) represents an appropriate range of the emission angle of the upper light beam at the maximum angle in the Y axis direction.

If the aforementioned value is less than the lower limit of the condition (3), the emission angle of the upper light beam is increased, and thus, the size of the folding mirror becomes large, and the intermediate image becomes large. If the intermediate image becomes large, the second reflecting surface becomes large, so that the projection optical system becomes large. In addition, since the angle between the light beam emitted from the first reflecting surface and the optical axis is decreased, the interference of the lens easily occurs. In addition, in order to project an image at an appropriate position on the screen, a radius of curvature of the second reflecting surface needs to be small. Accordingly, in the correction of the curvature of field and the distortion aberration, it is difficult to maintain balance, so that a manufacturing error sensitivity of the second reflecting surface is increased or the performance is deteriorated.

If the aforementioned value is less than the lower limit of the condition (4), interference occurs between the lens and the light beam.

Therefore, when the conditions (3) and (4) are satisfied at the same time, although the distance between the refraction optical system and the first reflecting surface is shortened, the interference of the light beam does not occur, and the diameter of the lens which is closest to the magnification side of the refraction optical system can be increased. Accordingly, the burden to the lens, particularly, the role of the correction of the curvature of field is increased, so that the burden to the second reflecting surface can be reduced. In addition, the manufacturing error sensitivity is decreased, the performance is improved, and the miniaturization of the second reflecting surface and the miniaturization of the apparatus can be particularly effectively implemented.

Feature 3

In the projection optical system according to example embodiments of the present invention, in addition to Features 1 and 2, a magnification-side surface of the lens which is arranged to be closest to the magnification side of the refraction optical system is a convex and aspherical surface.

According to the feature, since the closest-magnification-side lens is configured to have a convex surface, the effect of deflection of the main light beam is improved, so that the intermediate image can be small. Therefore, the first reflecting surface and the second reflecting surface can be miniaturized. In addition, the interference between the lens and the light beam can be easily avoided. In addition, since the closest-magnification-side lens is configured to have an aspherical surface, the effect of deflection of the main light beam and the effect of correction of the curvature of field can be improved.

Feature 4

In the projection optical system according to example embodiments of the present invention, in addition to Features 1 to 3, the projection optical system further includes a both-side aspherical biconcave lens A having a negative power on the optical axis and a positive power in the periphery.

Since the lens has a convex power in the periphery, an emission angle of the main light beam of off-axis light emitted from the refraction optical system can be reduced, the miniaturization and the high performance of the apparatus can be implemented. Preferably, the aspherical lens is different from the aspherical lens having a convex shape, which is described above referring to Feature 3. Alternatively, the aspherical lens may be the same as the aspherical lens having a convex shape. Since a plurality of aspherical surfaces are used, it is possible to control the distortion aberration and the curvature of field at a high accuracy, and it is possible to implement a high-performance projection optical system in combination with the effect of the concave mirror.

Feature 5

In the projection optical system according to example embodiments of the present invention, in addition to Features 1 to 4, the aspherical lens is arranged between a spherical lens of which distance between an intersection of a lower light beam at the maximum angle of view in the Y axis direction and a surface and the optical axis is at maximum, and the first reflecting surface.

According to the feature, it is possible to control distortion and a curvature of field at a high accuracy by using the aspherical lens as described above in a portion where light beams are sufficiently separated.

Feature 6

In the projection optical system according to example embodiments of the present invention, in addition to Features 1 to 5, the first reflecting surface is a plane mirror and is rotated by 45 degrees on the YZ plane.

Herein, the 45 degrees represent that the normal line of the plane mirror is rotated by 45 degrees (−45 degrees in the a direction) from the Z axis toward the Y axis direction. According to the feature, since the optical system can be folded and bended by 90 degrees without any change in performance, the miniaturization can be effectively implemented.

Feature 7

In the projection optical system according to example embodiments of the present invention, in addition to Features 1 to 6, the second reflecting surface is a concave mirror.

According to the feature, since the intermediate image of the refraction optical system is magnified and projected by the concave mirror, the miniaturization of the projection optical system can be implemented.

Feature 8

In the projection optical system according to example embodiment of the present invention, in addition to Features 1 to 7, in a focus state where the L is at minimum, when paraxial magnification of the refraction optical system is denoted by β, the following condition (5) is satisfied.

$$5<\beta<8. \qquad \text{condition (5)}$$

The condition (5) is a mathematical formula for specifying an appropriate range of the size of the intermediate image. If the aforementioned value is more than the upper limit of the condition (5), the power of the concave mirror can be decreased, and thus, the manufacturing error sensitivity is reduced. However, since the size of the concave mirror is increased, the miniaturization cannot be implemented.

In addition, if the aforementioned value is less than the lower limit of the condition (5), the miniaturization can be effectively implemented. However, the power of the concave mirror needs to be increased in order to obtain a desired size of the projection image, and thus, the manufacturing error sensitivity needs to be increased. In addition, more preferably, the following condition (5') is satisfied.

$$6<\beta<7. \qquad \text{condition (5')}$$

Feature 9

In the projection optical system according to example embodiments of the present invention, in addition to Features 1 to 8, the second reflecting surface has a shape of a free-form curved surface.

Since the second reflecting surface is configured to have a shape of a free-form curved surface, it is possible to correct the curvature of field and the distortion aberration at a high accuracy.

Feature 10

In the projection optical system according to example embodiments of the present invention, in addition to Features 1 to 9, the image forming unit does not intersect the optical axis.

Since an axial light beam is not used, it is possible to control the curvature of field and the distortion aberration at a high accuracy by using the aspherical lens and the free-form curved mirror.

Feature 11

In the projection optical system according to example embodiments of the present invention, in addition to Features 1 to 10, at least the lens which is closest to the magnification side of the refraction optical system is moved during focusing.

Accordingly, it is possible to control a curvature of field and distortion which may occur due to focusing at a high accuracy. More preferably, floating focusing is used. Since a difference between the incidence angles of the light beams of the upper and lower ends of the image plane to the screen are great, the variation in curvature of field is increased in the focusing according to the projection distance. Herein, since the floating focusing is used, it is possible to correct the variation in curvature of field according to the variation in the projection distance.

Feature 12

According to example embodiments of the present invention, there is provided an image display apparatus including: an illumination optical system which illuminates an image forming unit with light from a light source; and a projection optical system which projects an image formed in the image forming unit on a projection plane, in which the projection optical system is the projection optical system according to any one of Features 1 to 11.

According to the feature, it is possible to obtain an image display apparatus having a very small projection distance and a small size.

Specific Numerical Values of Examples

Next, Table 25 illustrated in FIG. 74 lists examples of numerical values associated with the above-described conditions in the Examples 1 to 4.

Table 26 illustrated in FIG. 75 lists values according to each condition in each Example.

As clarified from Tables 25 and 26, in the projection optical systems according to Examples 1 to 4, the above-described values of the parameters associated with the conditions 1 to 5 are included within the range of each condition.

According the projection optical system specified by the above-described specific numerical examples, since an angle of a folded light beam, an effective diameter of a lens, a distance between a folding mirror and a lens, and a sag amount of an aspherical lens are set to appropriate values, it is possible to obtain a small-sized and high-performance image projection apparatus.

According to an embodiment of the present invention, it is possible to provide a projection optical system having an extremely short projection distance and a small size.

In addition, although appropriate specific examples of the present invention are exemplified in the above-described embodiments, the present invention is not limited thereto.

In particular, specific shapes and numerical values of components in Examples 1 to 4 are merely exemplified for implementing the present invention, and thus, the scope of the prevention invention should not be limited thereto.

The present invention is not limited to the description of the embodiments, but appropriate changes and modifications can be made without departing from the spirit of the present invention.

What is claimed is:

1. A magnification optical system that enlarges an image of an object, the magnification optical system comprising:
   a refractive optical system including, in order from an object side to an enlarged side;
     a first lens group having a positive power,
     a second lens group having a positive power,
     a third lens group having a negative power, and
     a fourth lens group;
     a curved mirror that reflects light from the refractive optical system; and
   a focus structure that moves the second lens group, the third lens group, and the fourth lens group, and does not move the first lens group and the curved mirror.

2. The magnification optical system according to claim 1, wherein
   the focus structure moves the second lens group, the third lens group, and the fourth lens group by different amounts.

3. The magnification optical system according to claim 1, wherein
   the fourth lens group has a positive power.

4. The magnification optical system according to claim 1, wherein the fourth lens group comprises a single lens that is closer to the curved mirror in the refractive optical system than each of the other lenses in the refractive optical system.

5. The magnification optical system according to claim 1, wherein the fourth lens group is adjacent to the third lens group.

6. The magnification optical system according to claim 5, wherein the third lens group is adjacent to the second lens group.

7. A magnification optical system that enlarges an image of an object, the magnification optical system comprising:
   a first optical system including a plurality of lens groups;
   a second optical system including a curved mirror that reflects light received from the first optical system; and
   a focus structure that moves a part of the plurality of lens groups of the first optical system, wherein
   the plurality of lens groups includes, in order from an object side to an enlarged side:
     a first lens group,
     a second lens group having a positive power,
     a third lens group having a negative power, and
     a fourth lens group,
   the focus structure moves the third lens group and the fourth lens group, and does not move the first lens group and the curved mirror, to change an interval between the fourth lens group and the third lens group, and
   the focus structure further moves the second lens group.

8. The magnification optical system according to claim 7, wherein
   the focus structure moves the second lens group, the third lens group, and the fourth lens group by different amounts.

9. The magnification optical system according to claim 8, wherein the focus structure includes
   a first focus structure that moves the second lens group and the third lens group, and
   a second focus structure that moves the fourth lens group.

10. The magnification optical system according to claim 9, wherein the second focus structure is fixed after a focus adjustment is performed by the second focus structure.

11. The magnification optical system according to claim 7, wherein the fourth lens group comprises a single lens that is closer to the curved mirror in the refractive optical system than each of the other lenses in the first optical system.

12. The magnification optical system according to claim 7, wherein the fourth lens group is adjacent to the third lens group.

13. The magnification optical system according to claim 12, wherein the third lens group is adjacent to the second lens group.

* * * * *